United States Patent
Ootaka et al.

(10) Patent No.: US 11,899,097 B2
(45) Date of Patent: Feb. 13, 2024

(54) DISTANCE MEASUREMENT DEVICE AND DISTANCE MEASUREMENT METHOD

(71) Applicants: Kabushiki Kaisha Toshiba, Tokyo (JP); Toshiba Electronic Devices & Storage Corporation, Tokyo (JP)

(72) Inventors: Shoji Ootaka, Yokohama Kanagawa (JP); Masaki Nishikawa, Yokohama Kanagawa (JP); Katsuya Nonin, Kawasaki Kanagawa (JP); Hiroshi Yoshida, Yokohama Kanagawa (JP); Masayoshi Oshiro, Ota Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 509 days.

(21) Appl. No.: 17/200,486

(22) Filed: Mar. 12, 2021

(65) Prior Publication Data
US 2022/0091253 A1 Mar. 24, 2022

(30) Foreign Application Priority Data
Sep. 24, 2020 (JP) ................... 2020-159572

(51) Int. Cl.
G01S 13/76 (2006.01)
(52) U.S. Cl.
CPC .................... *G01S 13/765* (2013.01)
(58) Field of Classification Search
CPC ....................................................... G01S 13/76
See application file for complete search history.

(56) References Cited

U.S. PATENT DOCUMENTS 6,820,031 B1 11/2004 Hayakawa
7,561,048 B2 7/2009 Yushkov et al.
(Continued)

FOREIGN PATENT DOCUMENTS

JP 2001-033543 A 2/2001
JP 2009-150872 A 7/2009
(Continued)

OTHER PUBLICATIONS

Kim et al., "Vehicle Relay Attack Avoidance Methods Using RF Signal Strength", Communications and Network, 2013, 5, 573-577 (Year: 2013).*

*Primary Examiner* — Regis J Betsch
(74) *Attorney, Agent, or Firm* — Allen & Overy LLP

(57) ABSTRACT

A distance measurement device of an embodiment includes a first device including a first reference signal source and a first transmitter-receiver, a second device including a second reference signal source and a second transmitter-receiver, and a calculation unit configured to calculate a distance between the first device and the second device. One of a first distance measurement signal and a second distance measurement signal is transmitted once or more, and another is transmitted twice or more. The calculation unit calculates the distance based on a total of three or more pieces of first phase information and second phase information acquired through transmission of the distance measurement signals three times or more in total, a first sampling period based on a first reference signal, and a second sampling period based on a second reference signal.

20 Claims, 16 Drawing Sheets

(56) References Cited

U.S. PATENT DOCUMENTS

| | | |
|---|---|---|
| 7,872,583 B1 | 1/2011 | Yushkov et al. |
| 7,969,311 B2 | 6/2011 | Markhovsky et al. |
| 8,305,215 B2 | 11/2012 | Markhovsky et al. |
| 8,648,722 B2 | 2/2014 | Markhovsky et al. |
| 9,288,623 B2 | 3/2016 | Markhovsky et al. |
| 9,507,007 B2 | 11/2016 | Markhovsky et al. |
| 9,699,607 B2 | 7/2017 | Markhovsky et al. |
| 9,813,867 B2 | 11/2017 | Prevatt |
| 9,913,244 B2 | 3/2018 | Markhovsky et al. |
| 9,955,301 B2 | 4/2018 | Markhovsky et al. |
| 10,091,616 B2 | 10/2018 | Prevatt |
| 10,117,218 B2 | 10/2018 | Markhovsky et al. |
| 10,165,461 B2 | 12/2018 | Vamaraju et al. |
| 10,281,557 B2 | 5/2019 | Markhovsky et al. |
| 10,433,111 B2 | 10/2019 | Prevatt et al. |
| 10,440,512 B2 | 10/2019 | Prevatt et al. |
| 10,506,376 B2 | 12/2019 | Markhovsky et al. |
| 10,712,435 B2 | 7/2020 | Shimizu et al. |
| 10,834,531 B2 | 11/2020 | Markhovsky et al. |
| 10,845,453 B2 | 11/2020 | Markhovsky et al. |
| 10,863,313 B2 | 12/2020 | Markhovsky et al. |
| 10,873,830 B2 | 12/2020 | Markhovsky et al. |
| 2010/0172339 A1 | 7/2010 | Duan et al. |
| 2017/0248678 A1 | 8/2017 | Markhovsky et al. |
| 2018/0180702 A1 | 6/2018 | Markhovsky et al. |
| 2018/0267154 A1 | 9/2018 | Ootaka et al. |
| 2018/0335514 A1 | 11/2018 | Dees et al. |
| 2019/0204406 A1* | 7/2019 | Lubberhuizen ............ G01S 5/10 |
| 2019/0242967 A1 | 8/2019 | Markhovsky et al. |
| 2020/0120509 A1* | 4/2020 | Stitt ...................... G01S 13/765 |
| 2020/0142023 A1 | 5/2020 | Markhovsky et al. |
| 2020/0166631 A1* | 5/2020 | Tong .................... G01S 13/765 |
| 2020/0178028 A1 | 6/2020 | Markhovsky et al. |
| 2020/0182959 A1 | 6/2020 | Markhovsky et al. |
| 2020/0284888 A1 | 9/2020 | Shimizu et al. |
| 2023/0266421 A1* | 8/2023 | Naiki ...................... G01S 3/143 |
| | | 455/456.1 |
| 2023/0276395 A1* | 8/2023 | Kono ................... B60R 25/245 |
| | | 455/456.1 |

FOREIGN PATENT DOCUMENTS

| | | |
|---|---|---|
| JP | 2018-100973 A | 6/2018 |
| JP | 2018-155724 A | 10/2018 |
| JP | 2018-155725 A | 10/2018 |
| JP | 2019-503472 A | 2/2019 |
| JP | 2019-506081 A | 2/2019 |

* cited by examiner

DISTANCE MEASUREMENT DEVICE AND DISTANCE MEASUREMENT METHOD

CROSS-REFERENCE TO RELATED APPLICATIONS

This application is based upon and claims the benefit of priority from the prior Japanese Patent Application No. 2020-159572 filed in Japan on Sep. 24, 2020; the entire contents of which are incorporated herein by reference.

FIELD

Embodiments described herein relate generally to a distance measurement device and a distance measurement method.

BACKGROUND

Recently, a system with which doors of an automobile can be locked and unlocked by pressing a button of a key-fob without inserting a key into a keyhole has been employed on a large number of automobiles. In the system, the doors are locked and unlocked by using wireless communication between the key-fob and the automobile.

In addition, recently, a system with which doors can be locked and unlocked and an engine can be started without touching a key-fob has been employed.

However, incidents in which an automobile is stolen by performing an attack called a "relay attack" on wireless communication between a key-fob and the automobile have been occurring. In a proposed countermeasure against the attack, a distance between the key-fob and the automobile is measured, and control of the automobile through wireless communication is prohibited when it is determined that the measured distance is equal to or longer than a predetermined distance.

The distance between the key-fob and the automobile is measured by, for example, a method in which a predetermined radio frequency (RF) signal (distance measurement signal) is transmitted from one of a distance measurement device mounted on the key-fob and a distance measurement device mounted on the automobile, the transmitted distance measurement signal is received by the other distance measurement device, a time difference between a transmission time point and a reception time point, in other words, a flight time of the distance measurement signal is measured or estimated, and the obtained flight time is multiplied by a light speed to obtain the distance.

DETAILED DESCRIPTION

A distance measurement device of an embodiment includes a first device, a second device, and a calculation unit. The first device includes a first reference signal source configured to generate a first reference signal, and a first transmitter-receiver configured to transmit a modulated first distance measurement signal, receive a modulated second distance measurement signal, obtain a second demodulated signal through demodulation, and acquire second phase information of the second demodulated signal in a first sampling period based on the first reference signal. The second device includes a second reference signal source configured to operate independently from the first reference signal source and generate a second reference signal, and a second transmitter-receiver configured to transmit the second distance measurement signal, receive the first distance measurement signal, obtain a first demodulated signal through demodulation, and acquire first phase information of the first demodulated signal in a second sampling period based on the second reference signal. The calculation unit calculates a distance between the first device and the second device based on the first phase information and the second phase information. One of the first distance measurement signal and the second distance measurement signal is transmitted once or more, and another is transmitted twice or more. The calculation unit calculates the distance based on a total of three or more pieces of the first phase information and the second phase information acquired through transmission of the first distance measurement signal and the second distance measurement signal three times or more in total, the first sampling period, and the second sampling period.

First Embodiment (Configuration)

Figure 1:
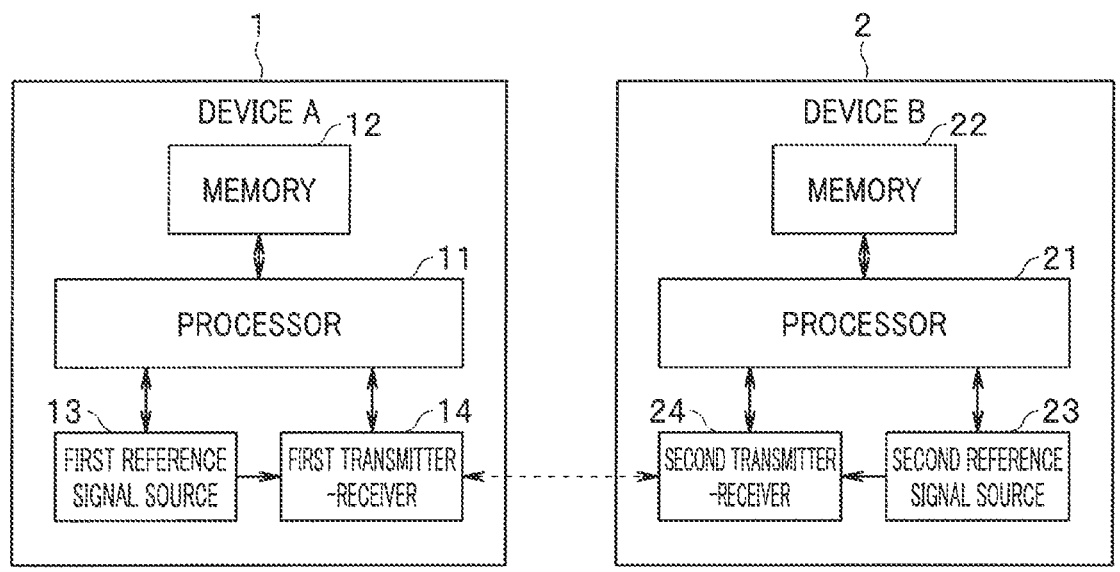
FIG. 1 is a block diagram illustrating a configuration of a distance measurement device according to a first embodiment.

FIG. 1 is a block diagram illustrating the configuration of a distance measurement device according to the present embodiment.

The distance measurement device includes a device A1 (hereinafter referred to as a device A) and a device B2 (hereinafter referred to as a device B) configured to perform wireless communication through a radio frequency (RF) signal. The device A and the device B are separated from each other by a certain distance, and the distance may time-sequentially change (at least one of the device A and the device B may be movable) but distance change in a time period in which distance measurement is performed once is negligible.

The device A includes a processor 11, a memory 12, a first reference signal source 13, and a first transmitter-receiver 14.

The device B includes a processor 21, a memory 22, a second reference signal source 23, and a second transmitter-receiver 24.

The first reference signal source 13 generates a first reference clock (first reference signal) and supplies the first reference clock to the processor 11, the memory 12, and the first transmitter-receiver 14.

The memory 12 stores a processing program to be executed by the processor 11, and various kinds of data used in processing at the processor 11.

The processor 11 controls transmission and reception operation of the first transmitter-receiver 14 in accordance with the processing program stored in the memory 12.

The first transmitter-receiver 14 generates a first sampling clock based on the first reference clock supplied from the first reference signal source 13. The first transmitter-receiver 14 transmits a modulated first distance measurement signal, receives a modulated second distance measurement signal transmitted from the second transmitter-receiver 24, and obtains a second demodulated signal through demodulation. The first transmitter-receiver 14 samples second phase information of the second demodulated signal at a timing of the first sampling clock.

In addition, the processor 11 calculates, based on a phase of a distance measurement signal sampled by the first transmitter-receiver 14, a flight time of the distance measurement signal in accordance with the processing program stored in the memory 12, and calculates a flight distance (distance between the device A and the device B) by multiplying the flight time by a light speed c.

The second reference signal source 23 operates independently from the first reference signal source 13, generates a second reference clock (second reference signal), and supplies the second reference clock to the processor 21, the memory 22, and the second transmitter-receiver 24.

The memory 22 stores a processing program to be executed by the processor 21, and various kinds of data used in processing at the processor 21.

The processor 21 controls transmission and reception operation of the second transmitter-receiver 24 in accordance with the processing program stored in the memory 22.

The second transmitter-receiver 24 generates a second sampling clock based on the second reference clock supplied from the second reference signal source 23. The second transmitter-receiver 24 transmits the second distance measurement signal, receives the first distance measurement signal, and obtains a first demodulated signal through demodulation. The second transmitter-receiver 24 samples first phase information of the first demodulated signal at a timing of the second sampling clock.

In addition, the processor 21 calculates, based on a phase of a distance measurement signal sampled by the second transmitter-receiver 24, the flight time of the distance measurement signal in accordance with the processing program stored in the memory 22, and calculates a flight distance (distance between the device A and the device B) by multiplying the flight time by the light speed c.

Note that the processor 11 and the processor 21 are a calculation unit configured to calculate the distance between the first device and the second device based on the first phase information and the second phase information. However, only one of the processor 11 and the processor 21 may be the calculation unit.

In the embodiment, a relatively narrow band signal using known modulation wave is used as each distance measurement signal. Specifically, a modulated signal is a gaussian filtered minimum-shift keying (GMSK) signal that repeats 0 and 1.

Figure 2:
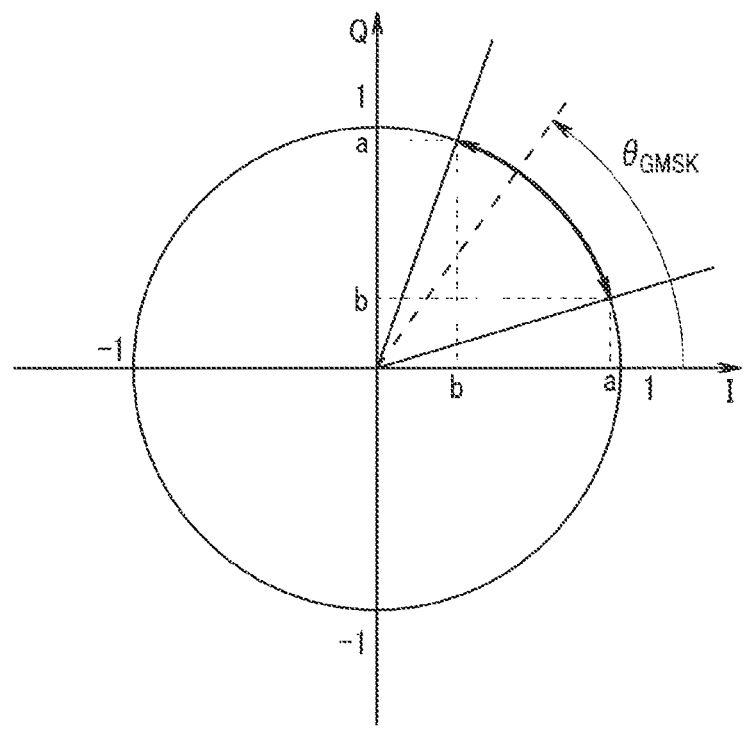
FIG. 2 is a graph illustrating a phase of a GMSK signal in the first embodiment.

FIG. 2 is a graph illustrating a phase of a GMSK signal according to the present embodiment.

The first transmitter-receiver 14 and the second transmitter-receiver 24 each demodulate a received GMSK signal by separating the GMSK signal into an in-phase component (I signal) and an orthogonal component (Q signal). The phase of the GMSK signal can be calculated based on the I and Q signals.

As illustrated in FIG. 2, on a phase plane, the GMSK signal, which repeats 0 and 1, does not transition between (I, Q)=(1, 0) and (I, Q)=(0, 1) but transitions between (I, Q)=(a, b) and (I, Q)=(b, a) due to influence of a Gauss filter.

Figure 3:
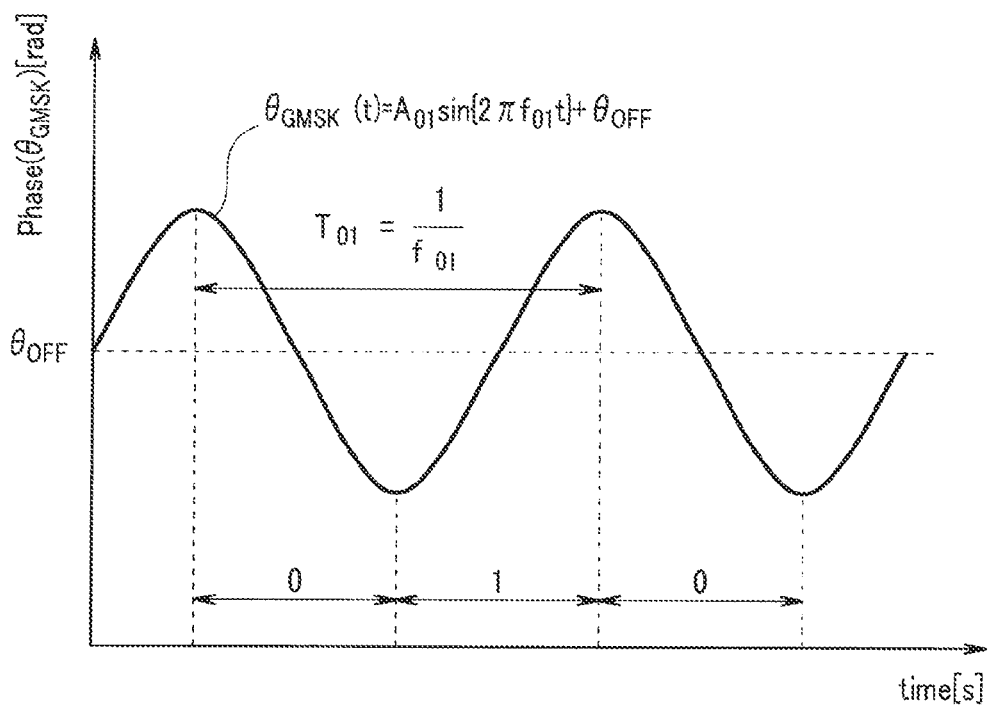
FIG. 3 is a graph illustrating temporal change of the phase of the GMSK signal in the first embodiment.

FIG. 3 is a graph illustrating temporal change of the phase of the GMSK signal according to the present embodiment. In FIG. 3, a horizontal axis represents time, and a vertical axis represents the phase with respect to an origin.

The phase $\theta_{GMSK}$ of the GMSK signal can be approximated by Expression (1).

$$\theta_{GMSK} \approx A_{01} \sin(2\pi f_{01} t) + \theta_{OFF} \quad (1)$$

In the expression, $A_{01}$ represents an amplitude of the phase of the GMSK signal, which repeats 0 and 1 (0 for a case in which the phase decreases, and 1 for a case in which the phase increases), $f_{01}$ represents a basic frequency (reciprocal of a basic period $T_{01}$) of the phase of the GMSK signal, which repeats 0 and 1, in other words, half of a transmission frequency of the GMSK signal, and $\theta_{OFF}$ represents an offset phase of the phase of the GMSK signal, which repeats 0 and 1, in other words, $\pi/4$. When a time is to be measured, for example, a time in which $\theta_{GMSK}$ indicated in Expression (1) becomes $\theta_{OFF}$ may be detected.

When frequencies (sampling frequencies) of the sampling clocks of the device A and the device B are set to be high, time resolution is high, and thus the time in which the phase $\theta_{GMSK}$ becomes $\theta_{OFF}$ is accurate. However, with taken into consideration low electric power consumption, it is desired that each sampling frequency is, for example, 16 times approximately higher than the basic frequency of the phase signal $\theta_{GMSK}$. To clearly determine in which of four quadrants a phase of the sine wave exists, each sampling clock needs a frequency four times or more higher than the basic frequency of the phase signal $\theta_{GMSK}$.

Under such a condition, accuracy of measurement of the flight time can be prevented from significantly decreasing by sampling the phase $\theta_{GMSK}$ based on the sampling clock of each of Devices A and B and applying a signal that can be approximated to the sine wave indicated in Expression (1). Note that, in the following description, a "signal that can be approximated to a sine wave" is simply referred to as a sinusoidal signal as long as no interpretation problem occurs. In addition, it is assumed that a sinusoidal signal such as the GMSK signal indicated in Expression (1) is used as a distance measurement signal.

Figure 4:
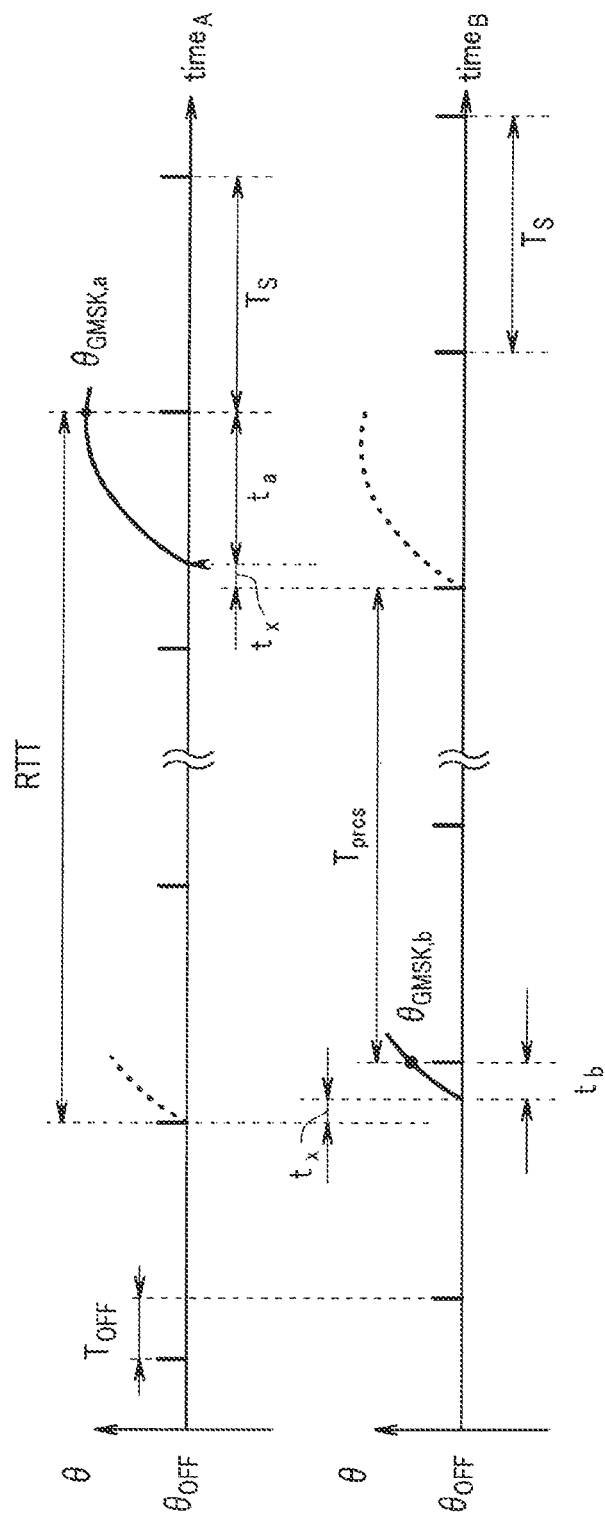
FIG. 4 is a time chart illustrating an example in which a distance measurement signal makes one round trip between a device A and a device B in the first embodiment.

FIG. 4 is a time chart illustrating an example in which a distance measurement signal makes one round trip between the device A and the device B in the present embodiment. FIG. 4 illustrates a case in which the first reference clock of the device A and the second reference clock of the device B have no error in frequency but have a reference time difference $T_{OFF}$.

FIG. 4 illustrates a time chart of the device A at an upper part and a time chart of the device B at a lower part. Since reference clock frequency is same between the device A and the device B, a sampling period $T_S$ is same. However, a sampling timing of the device B is shifted temporally later from a sampling timing of the device A by the reference time difference $T_{OFF}$.

A sinusoidal signal (distance measurement signal) starting at the phase $\theta_{OFF}$ is transmitted at the sampling timing of the device A, and the distance measurement signal is received by the device B after a flight time $t_x$ in accordance with the distance between Devices A and B has elapsed. In the time chart of FIG. 4 and later, a transmitted wave is illustrated with a dashed line, and received wave is illustrated with a solid line. In addition, phases $\theta_{GMSK,b}$ and $\theta_{GMSK,a}$ and the like sampled at the sampling clocks are illustrated with black circles.

A time point at which the phase $\theta_{GMSK,b}$ at the device B is sampled is a time point at which a time period to has elapsed since the distance measurement signal starting at the phase $\theta_{OFF}$ arrives at the device B. After a predetermined process time period $T_{pres}$ in which various kinds of calculation and the like are performed has elapsed since reception of the distance measurement signal is detected, the device B transmits a distance measurement signal at the sampling timing of the device B.

The distance measurement signal transmitted from the device B is received by the device A after elapse of the flight time $t_x$. A time point at which the phase $\theta_{GMSK,a}$ is sampled at the device A is a time point at which a time period $t_a$ has elapsed since the sinusoidal signal (distance measurement signal) starting at the phase $\theta_{OFF}$ arrives at the device A.

The elapsed time $t_a$ is calculated by Expression (2) from the phase $\theta_{GMSK,a}$ sampled by the device A, and the elapsed time to is calculated by Expression (3) from the phase $\theta_{GMSK,b}$ sampled by the device B.

$$t_a \approx \{1/(2\pi f_{01})\}\sin^{-1}\{(\theta_{GMSK,a}-\theta_{OFF})/A_{01}\} \tag{2}$$

$$t_b \approx \{1/(2\pi f_{01})\}\sin^{-1}\{(\theta_{GMSK,b}-\theta_{OFF})/A_{01}\} \tag{3}$$

Note that, in FIG. 4, phases in which Devices A and B start transmission at the timings of the sampling clocks are $\theta_{OFF}$. In each of Expressions (2) and (3), the elapsed times $t_a$ and $t_b$ are uniquely determined when the sampling frequency is four times or more higher than the frequency $f_{01}$ of the sinusoidal signal.

A round trip time RTT elapses until the device A receives a signal from the device B after the device A transmits a signal. As understood from FIG. 4, the round trip time RTT is expressed by Expression (4) as the sum of the flight time $t_x$ from the device A to the device B, the elapsed time $t_b$ until a signal is sampled since arrival at the device B, the process time period $T_{pres}$ at the device B, the flight time $t_x$ from the device B to the device A, and the elapsed time $t_a$ until a signal is sampled since arrival at the device A.

$$RTT=2t_x+t_a+t_b+T_{pres} \tag{4}$$

In the expression, a difference between the round trip time RTT and the process time period $T_{pres}$ is equal to the sampling period $T_S$, and thus Expression (5) is obtained.

$$T_S=2t_x+t_a+t_b \tag{5}$$

Expression (5) can be rewritten as Expression (6).

$$t_x=(T_S-t_a-t_b)/2 \tag{6}$$

Thus, the flight time $t_x$ can be accurately obtained through Expression (6) by calculating the elapsed time $t_a$ through Expression (2), calculating the elapsed time $t_b$ through Expression (3), and using the known sampling period $T_S$.

However, when there is error between the period (reciprocal of the frequency) of the first reference clock of the device A and the period of the second reference clock of the device B, error occurs to the flight time $t_x$ calculated through Expression (6). The error occurs by a reason described below.

For example, assume that the reference clock period $T_A$ of the device A is accurate and has no error and the reference clock period $T_B$ of the device B has error. A ratio $T_B/T_A$ of the reference clock period $T_B$ of the device B relative to the reference clock period $T_A$ of the device A is defined by Expression (7).

$$T_B/T_A=1-r_{err} \tag{7}$$

In the expression, $r_{err}$ represents an error ratio of the reference clock period $T_B$. A sample signal is generated by dividing or multiplying a reference clock signal, and each sampling frequency is proportional to the reference clock frequency. Thus, a ratio $T_{SB}/T_S$ of the sampling period $T_{SB}$ of the device B relative to the sampling period $T_S$ of the device A is expressed by Expression (8) similar to Expression (7).

$$T_{SB}/T_S=1-r_{err} \tag{8}$$

Note that the sampling period of the device A is not written as TSA because no error is assumed.

Figure 5:
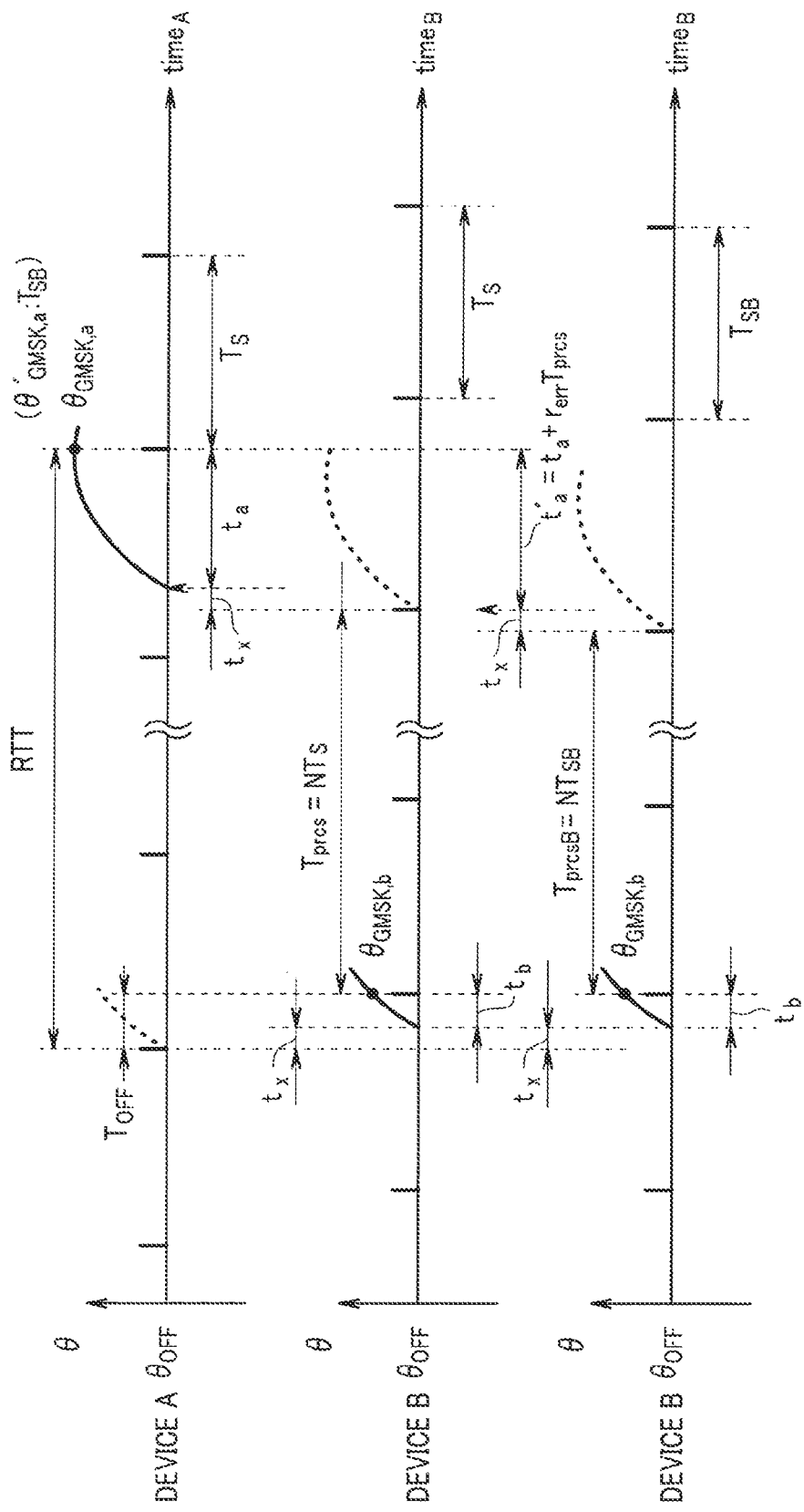
FIG. 5 is a time chart for description of error generated in a calculated flight time of the distance measurement signal as the distance measurement signal makes one round trip starting at the device A when a reference clock frequency of the device A has no error and a reference clock frequency of the device B has error in the first embodiment.

FIG. 5 is a time chart for description of error that occurs to the calculated flight time $t_x$ of the distance measurement signal when the reference clock frequency of the device A has no error and the reference clock frequency of the device B has error in the present embodiment. Note that error between the reference clock frequencies of Devices A and B means that the reference clock period of the device B has error.

FIG. 5 illustrates a time chart of the device A at an upper part, illustrates a time chart of the device B when the reference clock frequency has no error at a middle part, and illustrates a time chart of the device B when the reference clock frequency has error at a lower part.

When a time period $T_{presB}$ taken for a process at the device B is N times longer than the sampling period of the device B, Expression (9) is obtained.

$$T_{presB} = NT_{SB} \quad (9)$$

A numerator and a denominator on a left-hand side of Expression (8) are each multiplied by N to obtain Expression (10).

$$NT_{SB}/NT_S = 1 - r_{err} \quad (10)$$

Both sides of Expression (10) are multiplied by $NT_S$ to obtain Expression (11).

$$NT_{SB} = NT_S - r_{err}NT_S \quad (11)$$

Since $NT_S$ is the process time period $T_{pres}$ when the clock period has no error, Expression (12) is obtained by substituting Expression (9) into a left-hand side of Expression (11).

$$T_{presB} = T_{pres} - r_{err}T_{pres} \quad (12)$$

Expression (12) indicates that the process time period $T_{presB}$ of the device B is shorter than the process time period $T_{pres}$ when there is no error by $r_{err}T_{pres}$.

In FIG. 5, a time point at which the device B illustrated at the lower part starts transmission to the device A is earlier by $r_{err}T_{pres}$ than a time point at which the device B illustrated at the middle part starts transmission to the device A. As a result, a reception phase $\theta'_{GMSK,a}$ detected at the sampling clock of the device A advances by an amount by which the time point of transmission from the device B is earlier.

Thus, an elapsed time $t'_a$ since signal arrival at the device A, which is detected at the sampling timing of the device A, when the clock period of the device B has error is longer by $r_{err}T_{pres}$ than the elapsed time $t_a$ since signal arrival at the device A, which is detected at the sampling timing of the device A, when the clock period of the device B has no error, and accordingly, Expression (13) holds.

$$t'_a = t_a + r_{err}T_{pres} \quad (13)$$

When $t'_a$ to which error occurs is substituted into $t_a$ in Expression (6) to calculate a flight time $t'_x$, Expression (14) is obtained.

$$t'_x = (T_S - t_a - t_b - r_{err}T_{pres})/2 \quad (14)$$

As understood from comparison of Expression (14) with Expression (6), error due to $r_{err}T_{pres}$ occurs to the flight time $t'_x$. For example, when the process time period $T_{pres}$ is 100 [μs] and $r_{err}$ is 40 [ppm], $r_{err}T_{pres}/2$ is 2 [ns]. Conversion into distance by multiplying 2 [ns] by the light speed indicates that a distance error of 0.6 [m] occurs. The distance error further increases as the process time period and the clock period error further increase.

FIG. 5 illustrates that a distance measurement signal makes one round trip starting at the device A with a setting [Expression (7)] that the reference clock period of the device B is shorter by the error ratio $r_{err}$ than the reference clock period of the device A, which is accurate, and as a result, the flight time is estimated to be shorter by $r_{err}T_{pres}/2$ as indicated in Expression (14).

Subsequently, discussion is made on error that occurs to the flight time when a distance measurement signal makes one round trip starting at the device B with the setting of Expression (7).

Figure 6:
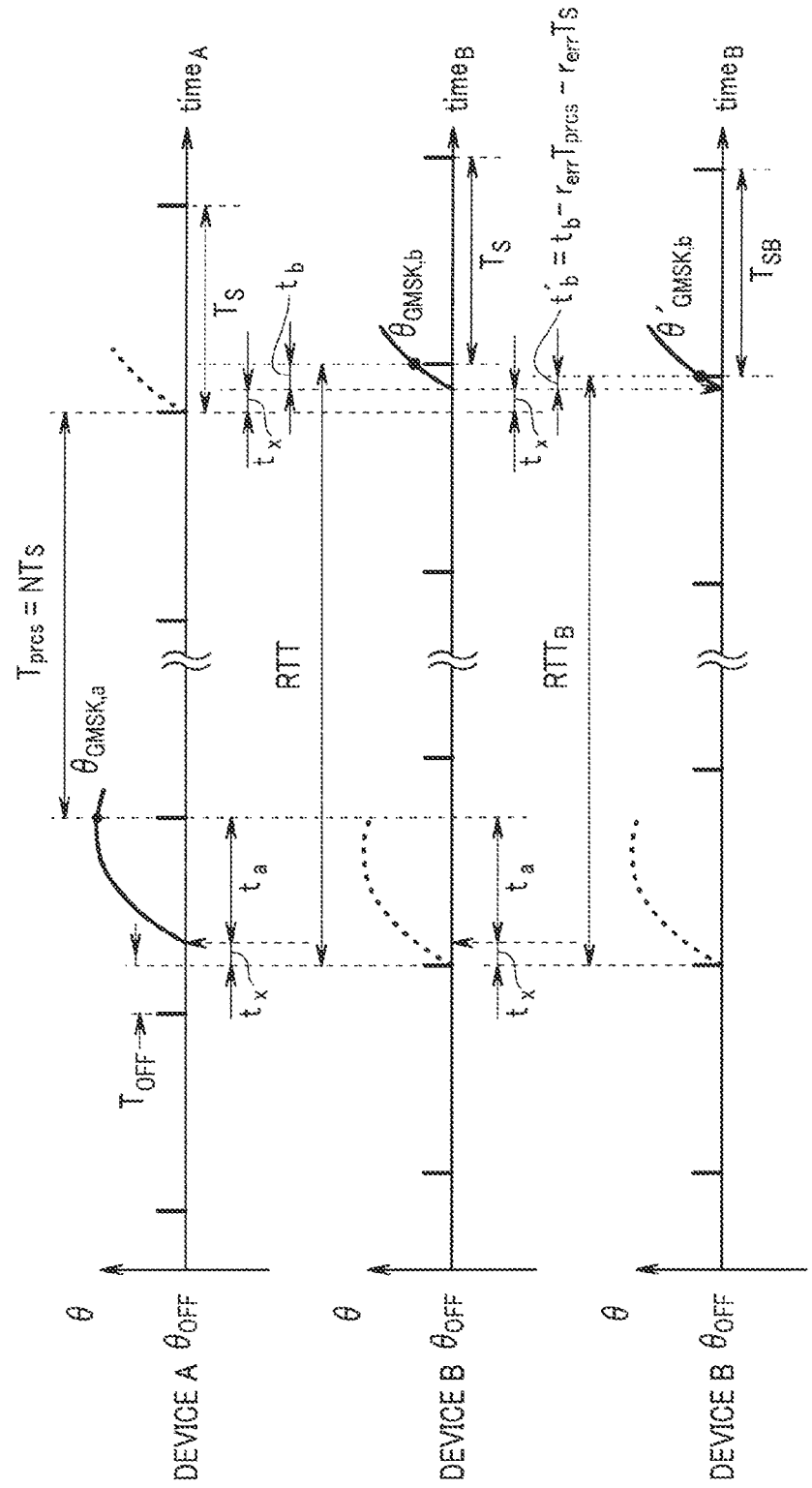
FIG. 6 is a time chart for description of error generated in a calculated flight time of the distance measurement signal as the distance measurement signal makes one round trip starting at the device B when the reference clock frequency of the device A has no error and the reference clock frequency of the device B has error in the first embodiment.

FIG. 6 is a time chart for description of error that occurs to the calculated flight time of a distance measurement signal as the distance measurement signal makes one round trip starting at the device B when the reference clock frequency of the device A has no error and the reference clock frequency of the device B has error in the present embodiment.

In FIG. 6, a time chart of the device A is illustrated at an upper part, a time chart of the device B when the reference clock frequency has no error is illustrated at a middle part, and a time chart of the device B when the reference clock frequency has error (the reference clock frequency is unique to the device B) is illustrated at a lower part. Note that FIG. 6 illustrates a case in which a time point at which the distance measurement signal is transmitted from the device B illustrated at the middle part to the device A and a time point at which the distance measurement signal is transmitted from the device B illustrated at the lower part to the device A are same.

When the distance measurement signal makes one round trip in a reverse order, as well, the round trip time RTT is expressed by Expression (4) and the flight time $t_x$ is expressed by Expression (6) as long as the reference clock periods of Devices A and B are both accurate.

However, when the distance measurement signal makes one round trip between the device B illustrated at the lower part and the device A illustrated at the upper part in FIG. 6, error due to the error ratio $r_{err}$ occurs to an estimated flight time (that is, flight distance) as described below.

$RTT_B$ represents the round trip time RTT detected based on an internal clock of the device B and is expressed by Expression (15).

$$RTT_B = 2t_x + t_a + t'_b + T_{pres} \quad (15)$$

In the expression, $t'_b$ is an elapsed time calculated by Expression (3) based on a detection phase $\theta'_{GMSK,b}$ of a GMSK signal received by the device B. Since $RTT_B = (N+1)T_{SB}$, Expression (16) is obtained by using Expression (8) and $T_{pres} = NT_S$.

$$RTT_B = (N+1)T_S - r_{err}(N+1)T_S = T_{pres} + T_S - r_{err}(N+1)T_S \quad (16)$$

Comparison of right hand sides of Expressions (15) and (16) obtains Expression (17).

$$T_S = 2t_x + t_a + t'_b + r_{err}(N+1)T_S \quad (17)$$

Comparison of Expressions (5) and (17) obtains Expression (18).

$$t'_b = t_b - r_{err}(N+1)T_S \quad (18)$$

Expression (18) means that a timing at which the distance measurement signal received from the device A is sampled by the device B at the lower part when the round trip time $RTT_B$ has elapsed is earlier by $r_{err}(N+1)T_S$ than a timing at which the distance measurement signal received from the device A is sampled by the device B at the middle part.

When $t'_b$ to which error has occurred is substituted into Expression (6) to calculate a flight time $t''_x$ and $T_{pres} = NT_S$ is used, Expression (19) is obtained.

$$t''_x = (T_S - t_a - t_b + r_{err}T_{pres} + r_{err}T_S)/2 \quad (19)$$

Comparison between Expression (14), which is obtained as the distance measurement signal makes one round trip starting at the device A, and Expression (19), which is obtained as the distance measurement signal makes one round trip starting at the device B indicates that the error time period $r_{err}T_{pres}$ has opposite signs between the expressions. In addition, the other error time period $r_{err}T_S$ in Expression (19) is clearly small as compared to $r_{err}T_{pres}$. Thus, the terms $r_{err}T_{pres}$ are eliminated by averaging the flight time $t'_x$ estimated by Expression (14) and the flight time $t''_x$ estimated by Expression (19), and the accuracy of the estimated time clearly improves.

For example, $r_{err}T_{pres}/4=1.25$ [μs] is obtained for $r_{err}=40$ [ppm] and $T_S=125$ [ns]. Conversion into distance by multiplying 1.25 [ps] by the light speed obtains a distance error of 0.4 [mm], which indicates significant improvement of measurement accuracy as compared to the distance error of 0.6 [m] when the distance measurement signal makes one round trip starting at the device A.

Thus, significant accuracy improvement of an estimated distance is achieved when the distance measurement signal is transmitted in the following order of the device A to the device B and distance measurement is performed, the distance measurement signal is transmitted in the following order of the device B to the device A and distance measurement is performed again, and results of the two distance measurements are averaged.

However, in FIG. 6, it is assumed that, when the distance measurement signal is transmitted by the device B, an elapsed time until the distance measurement signal is sampled since arrival at the device A is $t_a$, and the above-described calculation is performed based on the assumption.

The elapsed time $t_a$ illustrated in FIG. 5 is a time that elapses until sampling since an arrival time when the distance measurement signal from the device B is sampled by the device A after a time period $(N+1)T_S$ has elapsed since the distance measurement signal is transmitted by the device A.

Thus, the elapsed time $t_a$ illustrated in FIG. 6 is different from the elapsed time $t_a$ illustrated in FIG. 5. Despite of the difference between the elapsed times, the flight time of Expression (19) can be obtained as described below.

Specifically, it is described that, even when the distance measurement signal is transmitted by the device B with delay of a predetermined number of clocks, for example, L clocks, the flight time expressed by Expression (19) when the distance measurement signal is transmitted without delay holds, and the estimated flight distance is same irrespective of a time point at which the distance measurement signal is transmitted.

Figure 7:
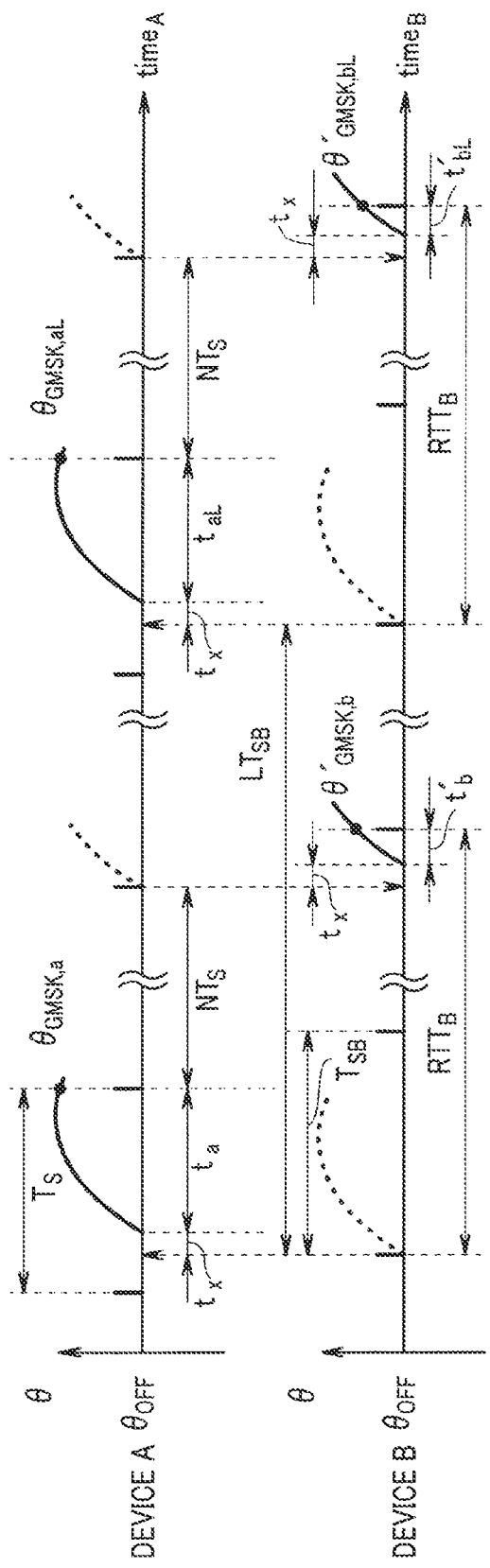
FIG. 7 is a time chart illustrating a sequence in which the distance measurement signal is transmitted in the following order of the device B to the device A and distance measurement is performed twice in the first embodiment.

FIG. 7 is a time chart illustrating a sequence in which the distance measurement signal is transmitted in the following order of the device B to the device A and distance measurement is performed twice in the present embodiment. In the sequence illustrated in FIG. 7, the distance measurement signal is transmitted in the following order of the device B to the device A, and first-time distance measurement is performed. Then, after a time period $LT_{SB}$ has elapsed since the first-time distance measurement signal is transmitted by the device B, the distance measurement signal is transmitted in the following order of the device B to the device A, and second-time distance measurement is performed.

A distance measurement result obtained by the first-time distance measurement is same as Expression (19).

In the second-time distance measurement, the distance measurement signal is transmitted from the device B after the time period $LT_{SB}$ has elapsed since the first-time distance measurement signal is transmitted by the device B. A time at which the transmitted distance measurement signal is received by the device A is represented by $t_{aL}$. The time $t_{aL}$ is a time calculated by substituting a phase $\theta_{GMSK,aL}$ observed (sampled) by the device A into Expression (2).

When the process time period $T_{pres}=NT_S$ has elapsed since the phase $\theta_{GMSK,aL}$ of the distance measurement signal is detected, the distance measurement signal is transmitted by the device A. The device B observes (samples) a phase $\theta'_{GMSK,bL}$ of the distance measurement signal from the device A and substitutes the phase into Expression (3) to calculate an elapsed time $t'_{bL}$.

The time period $LT_{SB}$ that has elapsed until the distance measurement signal is transmitted by the device B in the second-time distance measurement since the distance measurement signal is transmitted by the device B in the first-time distance measurement is expressed by Expression (20) by using Expression (8).

$$LT_{SB}=LT_S-r_{err}LT_S \qquad (20)$$

A transmission time point of the distance measurement signal of the device B is earlier by $r_{err}LT_S$ with respect to the device A. Thus, a time at which the distance measurement signal is received by the device A is earlier by the same amount, and accordingly, $t_{aL}$ is given by Expression (21).

$$t_{aL}=t_a+r_{err}LT_S \qquad (21)$$

However, since the round trip time $RTT_B=(N+1)T_{SB}$ is constant, the round trip time in the first-time distance measurement and the round trip time in the second-time distance measurement are same. The round trip time $RTT_B$ in the second-time distance measurement is given by Expression (22).

$$RTT_B=2t_x+t_{aL}+t'_{bL}+T_{pres} \qquad (22)$$

Since Expression (22) is same as Expression (15), $t'_{bL}$ is given by Expression (23).

$$t'_{bL}=t_b-r_{err}(N+1)T_S-r_{err}LT_S \qquad (23)$$

The flight time $t_x$ is calculated by substituting $t_{aL}$ into $t_a$ and substituting $t'_{bL}$ into $t_b$ in Expression (6) while assuming that the device A and the device B operate at accurate clocks. Accordingly. Expression (24) is obtained.

$$t_x=(T_S-t_{aL}-t'_{bL}=(T_S-t_a-t_b+r_{err}T_{pres}+r_{err}T_S)/2 \qquad (24)$$

Since Expressions (19) and (24) are same, a distance measurement result when the distance measurement signal is transmitted in the following order of the device B to the device A is same irrespective of a distance measurement start time. Thus, after the distance measurement signal is transmitted in the following order of the device A to the device B and the first-time distance measurement is performed, the distance measurement signal is transmitted in the following order of the device B to the device A and the second-time distance measurement is performed, and results of the two distance measurements are averaged to obtain the flight time and hence the flight distance at improved accuracy.

Figure 8:
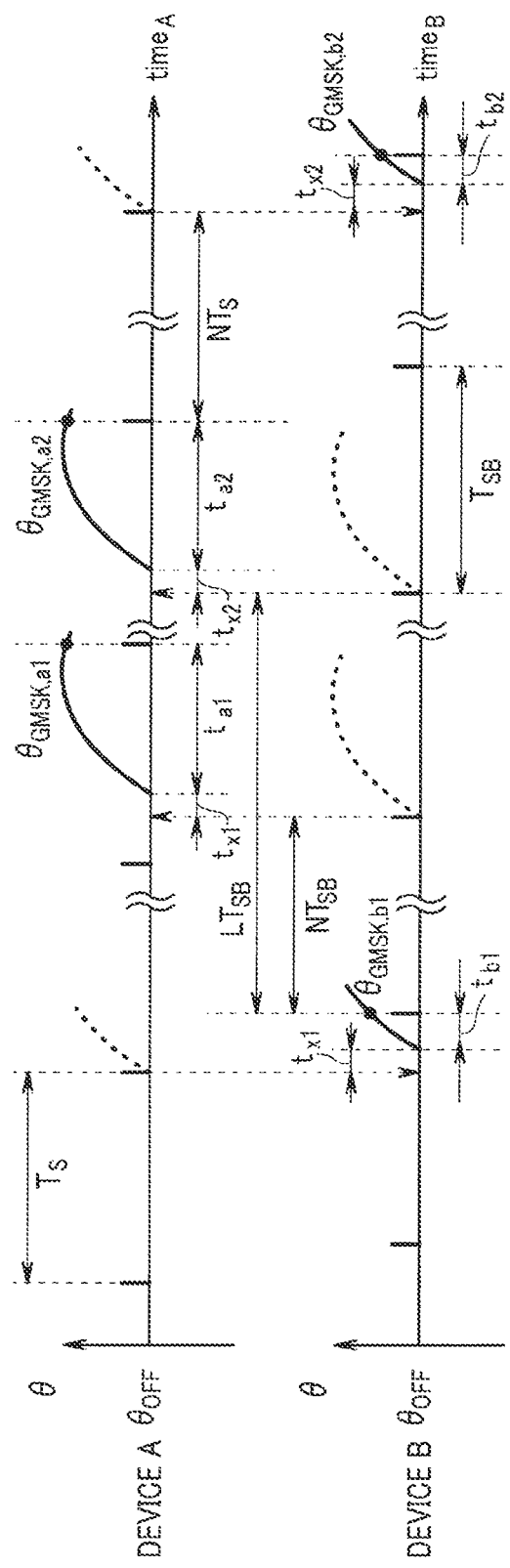
FIG. 8 is a time chart illustrating an exemplary specific distance measurement sequence according to the first embodiment.

FIG. 8 is a time chart illustrating an exemplary specific distance measurement sequence according to the present embodiment. In the distance measurement sequence illustrated in FIG. 8, the distance measurement signal is transmitted in the following order of the device A to the device B to the device B to the device A.

In FIG. 8, since the numbers of times of transmission and reception of the distance measurement signal by the device A and the device B are two, respectively, elapsed times from the first reception of the distance measurement signal to sampling by the device B and the device A are represented by $t_{b1}$ and $t_{a1}$, respectively, and elapsed times from the second reception of the distance measurement signal to sampling by the device B and the device A are represented by $t_{b2}$ and $t_{a2}$, respectively.

When a flight time estimated from $t_{b1}$ and $t_{a1}$ is represented by $t_{x1}$ and a flight time estimated from $t_{b2}$ and $t_{a2}$ is represented by $t_{x2}$, Expressions (25) and (26) are obtained from Expressions (14) and (24), respectively.

$$t_{x1}=(T_S-t_{a1}-t_{b1})/2=(T_S-t_a-t_b-r_{err}T_{pres})/2 \quad (25)$$

$$t_{x2}=(T_S-t_{a2}-t_{b2})/2=(T_S-t_a-t_b+r_{err}T_{pres}+r_{err}T_S)/2 \quad (26)$$

Thus, the flight time $t_x$ obtained by averaging $t_{x1}$ and $t_{x2}$ is given by Expression (27).

$$t_x=(t_{x1}+t_{x2})/2=\{T_S-t_a-t_b+(r_{err}T_S)/2\}/2 \quad (27)$$

According to the first embodiment, round trip sequences with different starting points, namely, a distance measurement sequence in which the distance measurement signal makes a round trip starting at the device A and a distance measurement sequence in which the distance measurement signal makes a round trip starting at the device B are performed, and flight times obtained by the respective distance measurement sequences are averaged. Accordingly, when the reference clock periods of the device A and the device B have error, error of an estimated flight time can be significantly reduced, and thus, error of the flight distance obtained by multiplying the flight time by the light speed can be significantly reduced.

Specifically, in the present embodiment, a time offset ($T_{OFF}$ illustrated in FIG. 6) can be corrected through one round trip of the distance measurement signal, and a frequency offset can be corrected by adding one round trip of the distance measurement signal with a different starting point and performing averaging. When a reference clock frequency corresponding to the reference clock period $T_A$ of the device A is represented by $f_A$ and a reference clock frequency corresponding to the reference clock period $T_B$ of the device B is represented by $f_B$, Expression (7) becomes Expression (46) to be described later, and a corrected frequency offset is $r_{err}f_B$ obtained from Expression (46).

Note that although flight times are averaged in the above description, flight distances may be calculated from the flight times and then averaging may be performed, or sampled phases may be averaged and then a flight time and a flight distance may be calculated (refer to Expression (72) in a seventh embodiment, for example).

Second Embodiment

In a second embodiment, any part same as a part in the first embodiment is denoted by the same reference sign, description of the part is omitted, and difference will be mainly described.

In the above description, elapsed times until phase signals are sampled since crossing the phase offset $\theta_{OFF}$ corresponding to a zero cross point are measured by Devices A and B. In description of the first embodiment, the phase $\theta_{GMSK,a}$ or $\theta_{GMSK,b}$ at a sample point right after reception is started is measured, and one phase data is targeted.

However, when one reception duration of the distance measurement signal is long as compared to a period $1/f_{01}$ of the distance measurement signal, and for example, the distance measurement signal of K periods (K is a natural number) can be received, an elapsed time until sampling since crossing of a plurality of phase offsets $\theta_{OFF}$ can be measured in one reception duration of the distance measurement signal. In this case, measurement variance of phase detection due to noise and the like can be prevented by detecting the phase a plurality of times and averaging the phases, and thus the flight time $t_x$ can be accurately estimated.

However, it is needed to prove that, when there is a frequency offset between the reference clocks of Devices A and B, the flight time $t_x$ calculated by one phase detection is equal to the flight time $t_x$ calculated by detecting the phase a plurality of times and performing averaging. The following proves that these flight times are equal.

Assume that, when there is no frequency error, the period $1/f_{01}$ of the distance measurement signal is m times longer than the sampling period $T_S$, and a duration in which the distance measurement signal is received is $K/f_{01}$.

Figure 9:
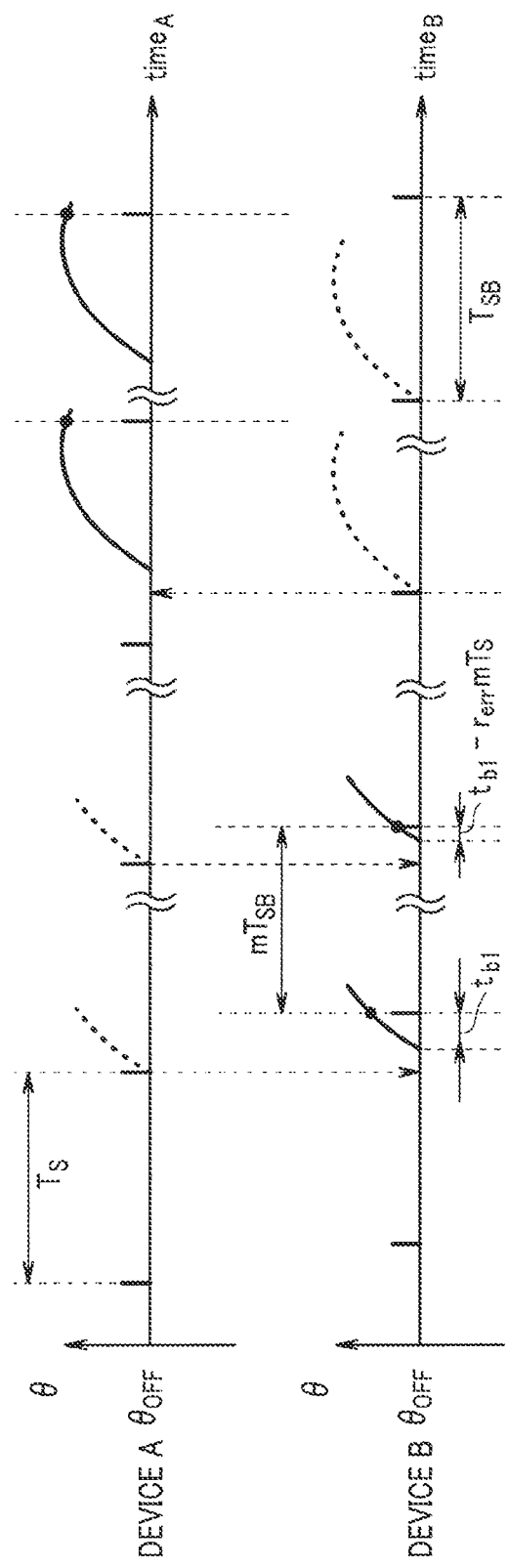
FIG. 9 is a time chart for description of exemplary decrease of an elapsed time in which the distance measurement signal is transmitted from the device A to the device B and detected at intervals of m sampling periods in a second embodiment.

First, when the distance measurement signal is transmitted from the device A to the device B, a sum $t_{sumB}$ of detection elapsed times sampled K times (elapsed times until sampling since crossing of $\theta_{OFF}$) is calculated with reference to FIG. 9. FIG. 9 is a time chart for description of exemplary decrease of an elapsed time in which the distance measurement signal is transmitted from the device A to the device B and detected at intervals of m sampling periods in the present embodiment. In other words, the sampling period of the device B is shorter than the sampling period of the device A.

A time at which the distance measurement signal is sampled by the device B for the first time is referred to as a time $t_{b1}$ based on a detection phase $\theta_{GMSK,b1}$. An elapsed time until next phase detection since phase detection for the first time is represented by $mT_{SB}$.

A detection time for the second time is earlier than a correct time by $r_{err}mT_S$ by using Expression (8) because $mT_{SB}$ has elapsed since a detection time for the first time, and thus an observed time is $t_{b1}-r_{err}mT_S$.

Similarly, by analogy, a k-th detection time is $t_{b1}-(k-1)r_{err}mT_S$. Thus, the sum $t_{sumB}$ of the first to K-th detection times is given by Expression (28).

$$t_{sumB}=\Sigma_1^K\{t_{b1}-(k-1)r_{err}mT_S\}=K(t_{b1}+r_{err}mT_S)-\{K(K+1)/2\}r_{err}mT_S \quad (28)$$

Thus, an average of $t_{sumB}$ when detection is performed K times is given by Expression (29).

$$t_{sumB}/K=t_{b1}-\{(K-1)/2\}r_{err}mT_S \quad (29)$$

When the distance measurement signal is transmitted from the device A to the device B, an average of elapsed times detected K times at intervals of m sampling periods is shorter than an elapsed time detected only once on the first time by an elapsed time $\{(K-1)/2\}r_{err}mT_S$.

Figure 10:
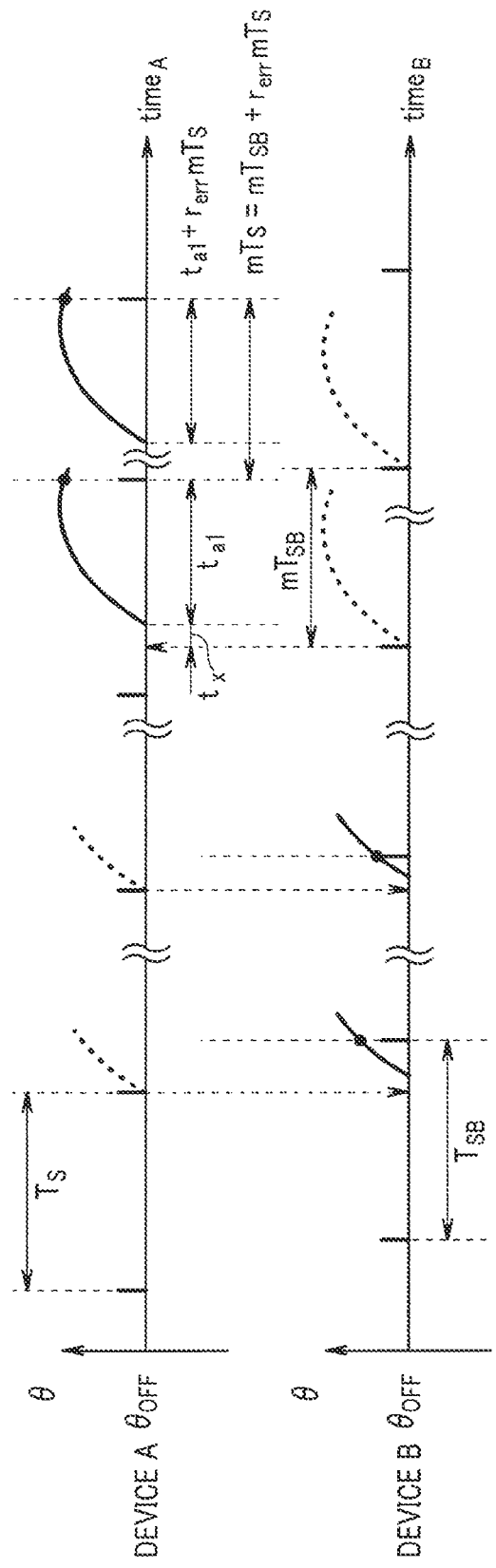
FIG. 10 is a time chart for description of exemplary increase of an elapsed time in which the distance measurement signal is transmitted from the device B to the device A and detected at intervals of m sampling periods in the second embodiment.

Subsequently, an elapsed time based on phases detected K times by the device A when the distance measurement signal is transmitted from the device B to the device A after the time period $NT_{SB}$ has elapsed is calculated with reference to FIG. 10. FIG. 10 is a time chart for description of exemplary increase of an elapsed time in which the distance measurement signal is transmitted from the device B to the device A and detected at intervals of m sampling periods according to the present embodiment.

An elapsed time calculated based on initial phase detection is represented by $t_{a1}$. A time difference between first phase detection and second phase detection is $mT_S$, time advances by $r_{err}mT_S$ at the device B in $mT_S$, and the distance measurement signal is transmitted earlier accordingly. Thus, an elapsed time calculated based on the second phase detection is $t_{a1}+r_{err}mT_S$.

Similarly, by analogy, a k-th detection elapsed time is $t_{a1}+(k-1)r_{err}mT_S$. Thus, a sum $t_{sumA}$ of the first to K detection elapsed times is given by Expression (30).

$$t_{sumA}=\Sigma_1^K\{t_{a1}+(k-1)r_{err}mT_S\}=K(t_{a1}-r_{err}mT_S)+\{K(K+1)/2\}r_{err}mT_S \qquad (30)$$

Thus, an average of $t_{sumA}$ when detection is performed K times is given by Expression (31).

$$t_{sumA}/K=t_{a1}+\{(K-1)/2\}r_{err}mT_S \qquad (31)$$

When the distance measurement signal is transmitted from the device B to the device A, an average of elapsed times detected K times at intervals of m sampling periods is longer than an elapsed time detected only once on the first time by the elapsed time $\{(K-1)/2\}r_{err}mT_S$.

However, when $t_{sumA}/K$ and $t_{sumB}/K$ are used in place of $t_a$ and $t_b$ in Expression (6), a flight time $t_{x1\_avg}$ of an initial round trip is estimated as in Expression (32).

$$t_{x1\_avg}=\{T_S-(t_{sumA}/K)-(t_{sumB}/K)\}/2=(T_S-t_{a1}-t_{b1})/2=(T_S-t_a-t_b-r_{err}T_{pres})/2=t_{x1} \qquad (32)$$

This is same as a flight time without averaging.

Figure 11:
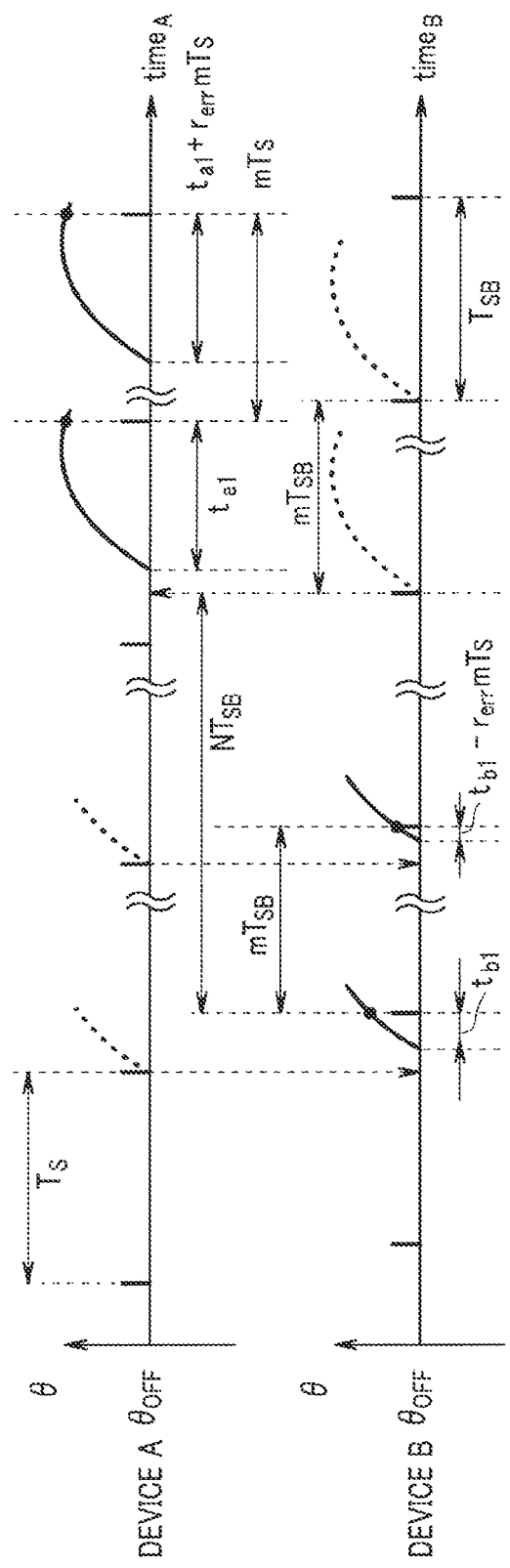
FIG. 11 is timing charts for illustrating an example of averaging elapsed times obtained by performing phase detection K times at the device B and the device A in a sequence in which the distance measurement signal is transmitted from the device A to the device B and then the distance measurement signal is transmitted from the device B to the device A in the second embodiment.

FIG. 11 is timing charts for illustrating an example of averaging of elapsed times obtained by performing phase detection K times at the device B and the device A in a sequence in which the distance measurement signal is transmitted from the device A to the device B and then the distance measurement signal is transmitted from the device B to the device A in the present embodiment.

In the first embodiment, when a flight time is calculated through one phase detection, error due to a frequency difference included in the estimated flight time $t_{x1}$ is reduced by averaging elapsed times calculated by using a sequence in which the distance measurement signal is transmitted from the device A to the device B, from the device B to the device A, from the device B to the device A, and from the device A to the device B as illustrated in FIG. 8.

Similarly, in the present embodiment, error of flight time estimation is reduced by using the sequence illustrated in FIG. 8 when elapsed times obtained from phases detected K times at intervals of m sampling periods are averaged.

Figure 12:
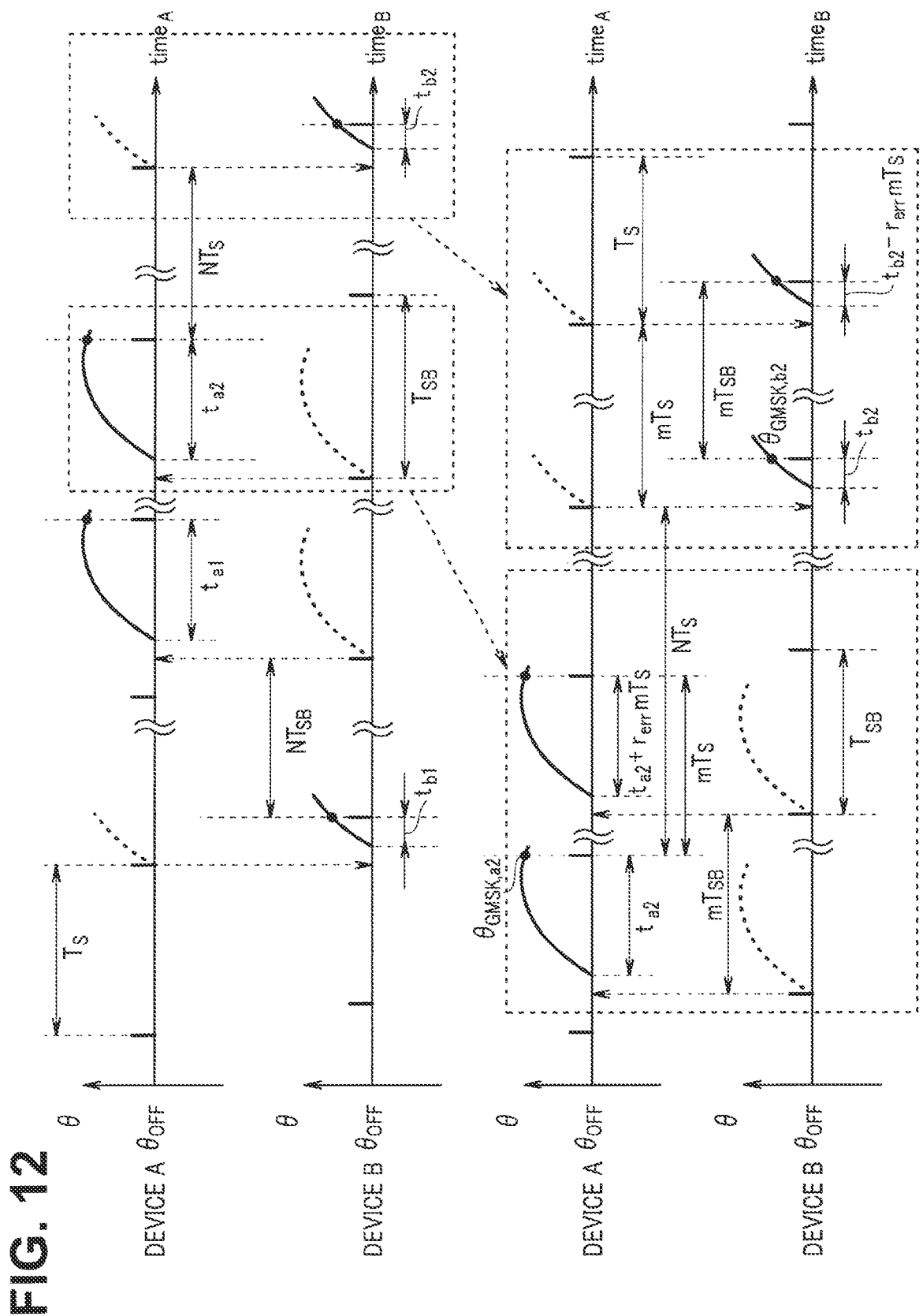
FIG. 12 is a time chart illustrating an exemplary sequence in which phase detection is performed K times in accordance with a latter half part of FIG. 8 in comparison with the sequence of FIG. 8 in which the distance measurement signal is transmitted in the following order of the device A to the device B to the device B to the device A and phase detection is performed once in the second embodiment.

FIG. 12 is a time chart illustrating an exemplary sequence in which phase detection is performed K times in accordance with a latter half part of FIG. 8 in comparison with the sequence of FIG. 8 in which the distance measurement signal is transmitted in the following order of the device A to the device B to the device B to the device A and phase detection is performed once per transmission in the present embodiment.

A sequence on first and second rows in FIG. 12 is same as the sequence in FIG. 8. A sequence on third and fourth rows in FIG. 12 illustrates an image of a sequence corresponding to the latter half part in FIG. 8, in which the distance measurement signal is transmitted from the device B to the device A and from the device A to the device B and phase detection is performed K times. Note that an image of a sequence corresponding to a first half part of FIG. 8, in which the distance measurement signal is transmitted from the device A to the device B and from the device B to the device A respectively and phase detection is performed K times is illustrated in FIG. 11 and thus omitted in FIG. 12.

As illustrated on the third and fourth rows in FIG. 12, when the distance measurement signal is transmitted from the device B to the device A and the distance measurement signal is received by the device A, a first detection phase is $\theta_{GMSK,a2}$, and an elapsed time corresponding to the detection phase is $t_{a2}$.

Thereafter, when phases are detected K times, a sum $t_{sumA2}$ of elapsed times calculated from the detected phases is equal to an expression obtained by replacing $t_{a1}$ with $t_{a2}$ in Expression (30). Thus, an average $t_{sumA2}/K$ of $t_{sumA2}$ is given by Expression (33).

$$t_{sumA2}/K=t_{a2}+\{(K-1)/2\}r_{err}mT_S \qquad (33)$$

Subsequently, when the distance measurement signal is transmitted from the device A to the device B and the distance measurement signal is received by the device B, a first detection phase is $\theta_{GMSK,b2}$, and an elapsed time corresponding to the detection phase is $t_{b2}$.

Thereafter, when phases are detected K times, a sum $t_{sumB2}$ of elapsed times calculated from the detected phases is equal to an expression obtained by replacing $t_{b1}$ with $t_{b2}$ in Expression (29). Thus, an average $t_{sumB2}/K$ of $t_{sumB2}$ is given by Expression (34).

$$t_{sumB2}/K=t_{b2}-\{(K-1)/2\}r_{err}mT_S \qquad (34)$$

When $t_{sumA2}/K$ and $t_{sumB2}/K$ are used in place of $t_a$ and $t_b$ in Expression (6), a flight time of a second round trip is estimated as in Expression (35), which is same as an estimated flight time without averaging.

$$t_{x2\_avg}=\{T_S-(t_{sumA2}/K)-(t_{sumB2}/K)\}/2=(T_S-t_a-t_{b2})/2=(T_S-t_a-t_b+r_{err}T_{pres}+r_{err}T_S)/2=t_{x2} \qquad (35)$$

A flight time $t_{x\_avg}$ is calculated by averaging $t_{x1\_avg}$ and $t_{x2\_avg}$ as in Expression (36).

$$t_{x\_avg}=(t_{x1\_sum}+t_{x2\_sum})/2=\{T_S-t_a-t_b+(r_{err}T_S/2)\}/2=t_x \qquad (36)$$

A flight time obtained by performing phase detection K times in a sequence in which the distance measurement signal is transmitted from the device A to the device B, from the device B to the device A, from the device B to the device A, and from the device A to the device B in the stated order and averaging elapsed times obtained from detected phases is same as a flight time obtained by performing phase detection once. However, the same result is obtained by an expectation value, and a result of the averaging has reduced error attributable to measurement variance.

According to the second embodiment, effects substantially same as effects of the first embodiment described above are achieved, and in addition, distance measurement can be performed at higher accuracy by increasing the amount of data sampled through the distance measurement sequence and averaging the obtained data.

Third Embodiment

Figure 13:
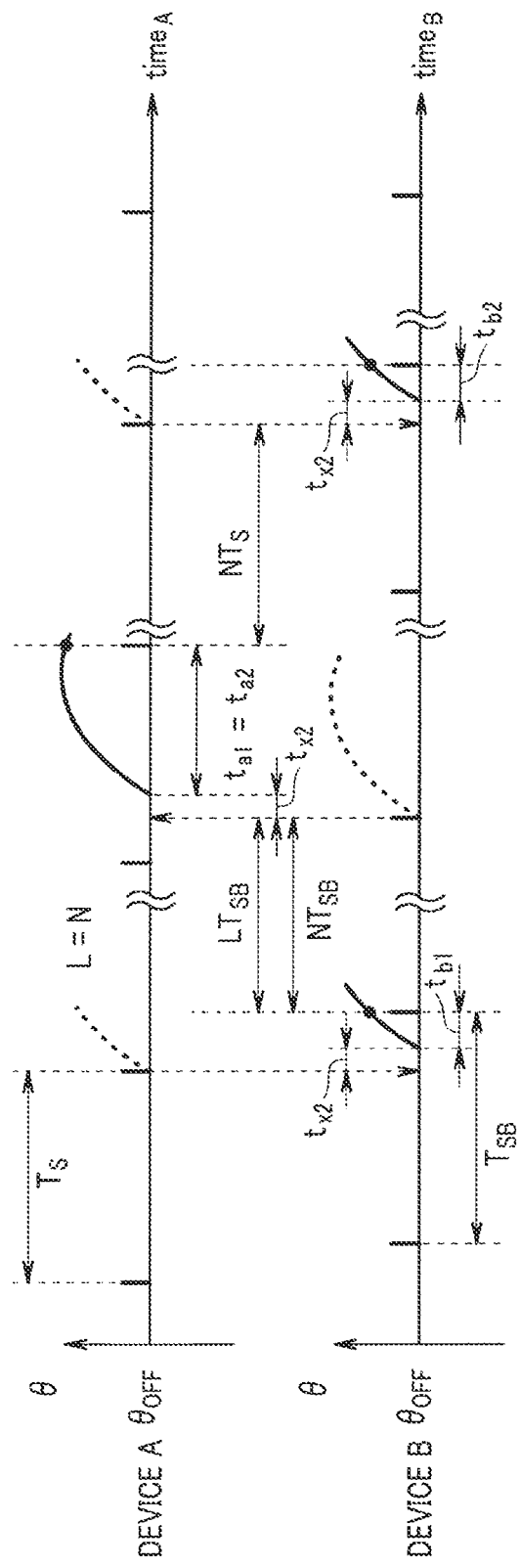
FIG. 13 is a time chart illustrating a 1.5 round trip sequence according to a third embodiment.

FIG. 13 is a time chart illustrating a 1.5 round trip sequence according to the present embodiment. In a third embodiment, any part same as a part in the first and second embodiments is denoted by the same reference sign, description of the part is omitted, and difference will be mainly described.

In the distance measurement sequence illustrated in FIG. 8, a time period from transmission of the distance measurement signal by the device A or the device B once to transmission of the next distance measurement signal by the device A or the device B corresponds to N sampling clocks, and thus a time period corresponding to 3N clocks is needed when the distance measurement signal is transmitted in the following order of the device A to the device B to the device B to the device A. The time period is $3NT_S$ when converted with the reference clock of the device A. The present embodiment employs a sequence (hereinafter referred to as 1.5 round trip sequence) illustrated in FIG. 13, thereby reducing a distance measurement time period from $3NT_S$ to $2NT_S$ approximately.

In the sequence in FIG. 8, phase measurement is performed twice by the device A to obtain the elapsed times $t_{a1}$ and $t_{a2}$. In the 1.5 round trip sequence of the present embodiment, as illustrated in FIG. 13, phase measurement is performed once by the device A, and the distance measurement signal is transmitted in the following order of the device A to the device B to the device A. The 1.5 round trip sequence corresponds to a case in which L=N is set in the sequence in FIG. 8, and thus $t_{a1}=t_{a2}$ is obtained. This corresponds to a time shift of one round trip sequence (the device B to the device A) in the latter half by $NT_S$.

As indicated by comparison between Expressions (19) and (24), one-round-trip distance measurement sequence of the device B to the device A obtains a unique flight time $t_{x2}$ irrespective of a starting point of time. Thus, an elapsed time observed in the sequence of the device B to the device A illustrated in FIG. 13 is $t_{x2}$.

Note that although not illustrated, it is clear that the method of performing phase detection K times for each m samples and averaging elapsed times obtained from detected phases according to the second embodiment is also applicable to the present embodiment.

According to the third embodiment, it is possible to reduce the distance measurement time period by using the 1.5-round-trip distance measurement sequence in effect in place of the two-round-trip distance measurement sequence in the first and second embodiments described above. In a specific example, a time period reduced by the sequence in FIG. 13 is 33% approximately of a time period by the sequence in FIG. 8.

Fourth Embodiment

In a fourth embodiment, any part same as a part in the first to third embodiments is denoted by the same reference sign, description of the part is omitted, and difference will be mainly described.

Calculation of the flight time $t_x$ needs data of the elapsed times $t_{a1}$ and $t_{a2}$, $t_{b1}$, and $t_{b2}$ until sampling since crossing of the phase offset $\theta_{OFF}$, the data being obtained through phase detection by the device A and the device B.

Data of $t_{b1}$ and $t_{b2}$ needs to be sent from the device B to the device A to calculate the flight time $t_x$ at the device A, and data of $t_{a1}$ and $t_{a2}$ needs to be sent from the device A to the device B to calculate the flight time $t_x$ at the device B.

This communication of distance measurement data is performed by using typical digital communication after the distance measurement data is detected. A time taken for communication of distance measurement data depends on requested accuracy, transmission rate, and the like of the distance measurement data and is, for example, a time period of several hundreds [µs] approximately in some cases. Thus, when communication of distance measurement data is unnecessary, a time taken for a distance measurement sequence is reduced. The present embodiment relates to a technology of producing the distance measurement signal that reduces or eliminates the time of communication of distance measurement data.

Figure 14:
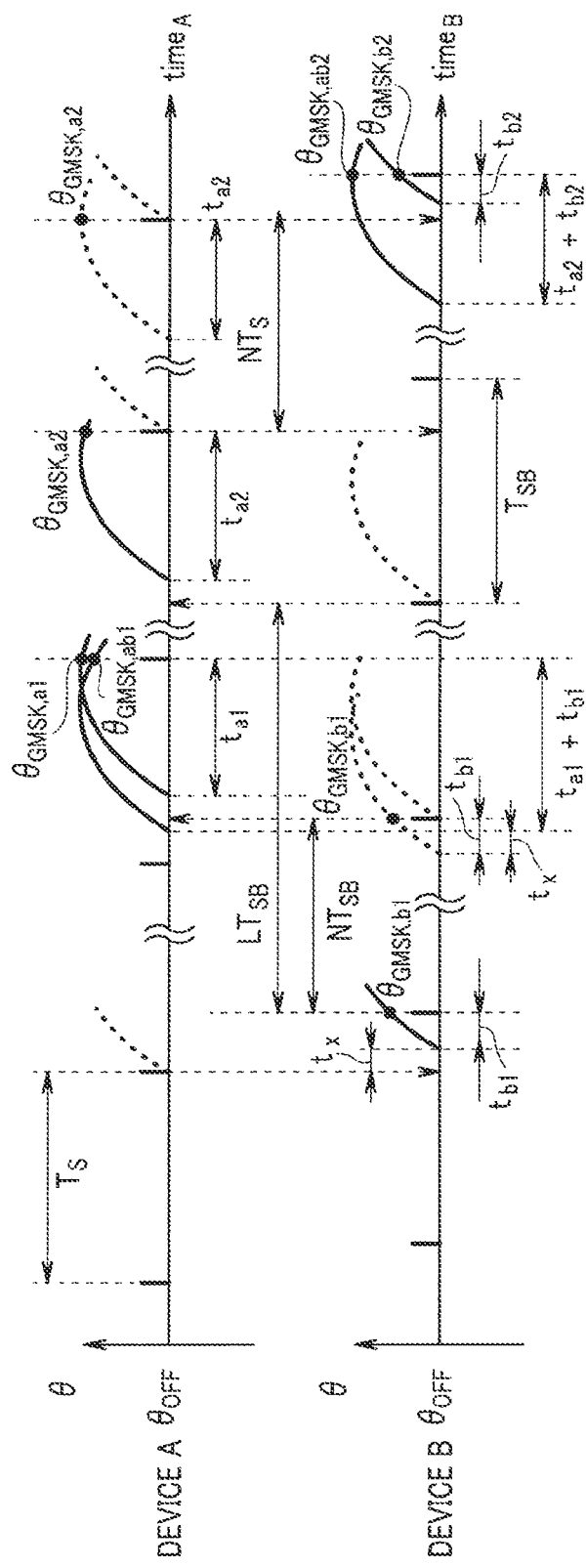
FIG. 14 is a time chart for description of a method of producing the distance measurement signal that reduces communication time in a distance measurement sequence in which the distance measurement signal is transmitted in the following order of the device A to the device B to the device B to the device A in a fourth embodiment.

FIG. 14 is a time chart for description of a method of producing the distance measurement signal that reduces communication time in a distance measurement sequence in which transmission of the distance measurement signal is performed in the following order of the device A to the device B to the device B to the device A in the present embodiment.

FIG. 14 is different from FIG. 8 of the first embodiment as follows. When the distance measurement signal is transmitted for a first time from the device B to the device A, the phase at the device B at the timing $NT_{SB}$ is the phase $\theta_{GMSK,b1}$, at which the distance measurement signal is received from the device A, instead of the offset phase $\theta_{OFF}$. In addition, when the distance measurement signal is transmitted for a second time from the device A to the device B, the phase at the timing $NT_S$ of the device A is the phase $\theta_{GMSK,a2}$, at which the distance measurement signal is received from the device B, instead of the offset phase $\theta_{OFF}$. Difference of these processes is that loop-back transmission is performed at a reception phase.

Note that the distance measurement time period is reduced by performing at least one of transmission of the distance measurement signal of the phase $\theta_{GMSK,b1}$ by the device B at the timing $NT_{SB}$ and transmission of the distance measurement signal of the phase $\theta_{GMSK,a2}$ by the device A at the timing $NT_S$.

The following describes a reason why the distance measurement time period is reduced by transmitting the distance measurement signal of the phase $\theta_{GMSK,b1}$ from the device B at the timing $NT_{SB}$. Assume that distance measurement calculation is performed by the device A.

When the distance measurement signal of the phase $\theta_{GMSK,b1}$ is transmitted by the device B at the timing $NT_{SB}$, a timing of the offset phase $\theta_{OFF}$ is earlier than the timing $NT_{SB}$ by $t_{b1}$. When a time point of the offset phase $\theta_{OFF}$ is a time point of transmission start of the distance measurement signal, the time point of transmission start is $NT_{SB}-t_{b1}$.

Subsequently, a case in which the distance measurement signal is received by the device A will be described. First, when the device B starts transmitting the distance measurement signal of the phase $\theta_{OFF}$ at the timing $NT_{SB}$, the device A samples a phase $\theta_{GMSK,a1}$ at the sampling timing and converts the phase $\theta_{GMSK,a1}$ into the detection elapsed time $t_{a1}$.

On the other hand, when the device B starts transmitting the distance measurement signal of the phase $\theta_{OFF}$ at the timing "$NT_{SB}-t_{b1}$", the device A determines that the distance measurement signal arrives earlier than the elapsed time $t_{a1}$ of the phase $\theta_{OFF}$ by the elapsed time $t_{b1}$. Accordingly, the phase sampled by the device A at the sampling timing is not the phase $\theta_{GMSK,a1}$ but the phase $\theta_{GMSK,ab1}$ corresponding to the reception earlier by the elapsed time $t_{b1}$. Thus, a relation of Expression (37) holds.

$$t_{a1}+t_{b1} \approx \{1/(2\pi f_{01})\}\sin^{-1}\{(\theta_{GMSK,ab1}-\theta_{OFF})/A_{01}\} \quad (37)$$

Thus, data of the elapsed time $t_{b1}$ detected by the device B can be acquired at the device A by detecting the phase $\theta_{GMSK,ab1}$. When the distance measurement signal of the phase $\theta_{OFF}$ is not transmitted from the device B at the timing "$NT_{SB}-t_{b1}$", the device B needs to transmit data of the detected elapsed time $t_{b1}$ to the device A.

Similarly, when the distance measurement signal of the phase $\theta_{GMSK,a2}$ is transmitted from the device A at the timing $NT_S$, the device B detects a phase $\theta_{GMSK,ab2}$, and this phase and an elapsed time "$t_{a2}+t_{b2}$" to be detected through a second round trip sequence have a relation of Expression (38).

$$t_{a2}+t_{b2} \approx \{1/(2\pi f_{01})\}\sin^{-1}\{(\theta_{GMSK,ab2}-\theta_{OFF})/A_{01}\} \quad (38)$$

However, this result needs to be transmitted to the device A when distance calculation is to be performed by the device A, and thus the phase of the distance measurement signal to be transmitted does not need to be shifted in a second round trip sequence. The result leads to a reduced distance measurement time period when distance calculation is performed by the device B. A result detected by Expression (28) needs to be transmitted to the device B when distance calculation is to be performed by the device B. Thus, phase shift of the distance measurement signal may be performed in accordance with whether to perform distance calculation at the device A or the device B.

For verification, improvement of distance measurement accuracy by using Expressions (37) and (38) will be described below. The averaged flight time $t_x$ can be rewritten as Expression (39) by using Expressions (25) to (27).

$$t_x=(t_{x1}+t_{x2})/2=\{2T_S-(t_{a1}-t_{b1})-(t_{a2}+t_{b2})\}/4 \quad (39)$$

The term $(t_{a1}+t_{b1})$ in Expression (39) can be calculated by Expression (37), and the term $(t_{a2}+t_{b2})$ in Expression (39) can be calculated by Expression (38). Thus, any one of Expressions (37) and (38) can be used depending on whether to perform distance calculation at the device A or the device B. and the amount of data communication in a detection time can be reduced.

Note that although not illustrated, it is clear that the method of performing phase detection K times for each m samples and averaging elapsed times obtained from detected phases in the second embodiment is also applicable to the present embodiment.

According to the fourth embodiment, effects substantially same as effects of the first to third embodiments described above are achieved, and in addition, a data communication time is reduced by transmitting a loop-back distance measurement signal at the phase of a received distance measurement signal, and the distance measurement time period can be further reduced.

Fifth Embodiment

In a fifth embodiment, any part same as a part in the first to fourth embodiments is denoted by the same reference sign, description of the part is omitted, and difference will be mainly described.

Figure 15:
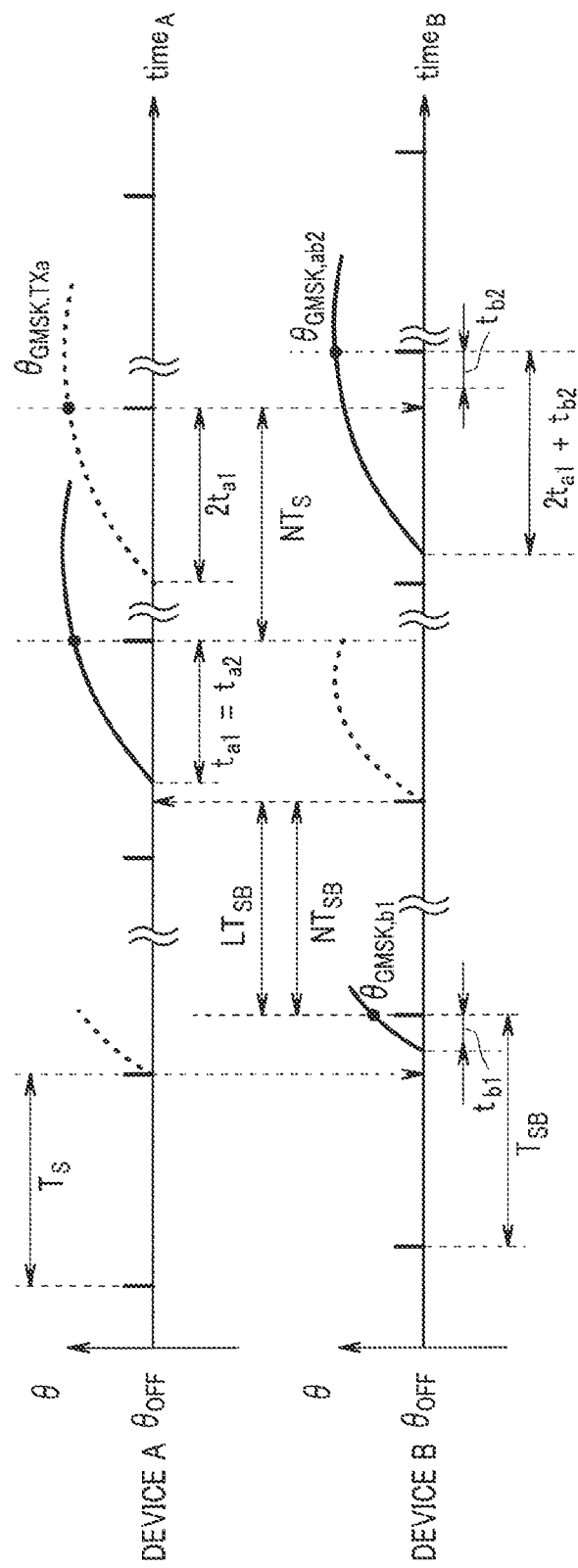
FIG. 15 is a time chart illustrating a sequence employing a 1.5 round trip sequence and phase loop-back distance measurement sequence in a fifth embodiment.

In the present embodiment, the distance measurement time period is further reduced by employing 1.5-round-trip distance measurement in the third embodiment and loop-back distance measurement at a received phase in the fourth embodiment. FIG. 15 is a time chart illustrating a sequence employing the 1.5 round trip sequence and the phase loop-back distance measurement sequence in the present embodiment. In the sequence in FIG. 15, the distance measurement signal is transmitted in the following order of the device A to the device B to the device A.

Difference between the sequence in FIG. 15 and the 1.5 round trip sequence in FIG. 13 is the phase of the distance measurement signal transmitted last by the device A. In FIG. 13, the distance measurement signal of the offset phase GOFF is transmitted at the timing $NT_S$ of the device A.

In contrast, in FIG. 15, a phase transmitted at the timing $NT_S$ is a phase $\theta_{GMSK,TXa}$ corresponding to an arrival time twice longer than the arrival time tai estimated from the phase $\theta_{GMSK,a1}$ received by the device A, in other words, $\theta_{GMSK,TXa}$ satisfying Expression (40).

$$2t_{a1}\approx\{1/(2\pi f_{01})\}\sin^{-1}\{(\theta_{GMSK,TXa}-\theta_{OFF})/A_{01}\} \quad (40)$$

When the distance measurement signal is transmitted from the device A to the device B at the phase $\theta_{GMSK,TXa}$, an estimated arrival time at the device B is a time longer than the elapsed time $t_{b2}$ estimated with $\theta_{GMSK,TXa}=\theta_{OFF}$ by $2t_{a1}$, and accordingly, the received phase is $\theta_{GMSK,ab2}$. Thus, Expression (41) holds.

$$2t_{a1}+t_{b2}\approx\{1/(2\pi f_{01})\}\sin^{-1}\{(\theta_{GMSK,ab2}-\theta_{OFF})/A_{01}\} \quad (41)$$

Alternatively, in a case of the 1.5 round trip, a left-hand side of Expression (43) is rewritten as a right hand side with interpretation of Expression (42) as described above.

$$2t_{a1}=t_{a2} \quad (42)$$

$$2t_{a1}+t_{b2}=t_{a1}+t_{a2}+t_{b2} \quad (43)$$

A phase detected by the device B having received the initial distance measurement signal from the device A is obtained by changing b to b1 in Expression (3), and thus the elapsed time $t_{b1}$ obtained from the detected phase is given by Expression (44).

$$t_{b1}\approx\{1/(2\pi f_{01})\}\sin^{-1}\{(\theta_{GMSK,b1}-\theta_{OFF})/A_{01}\} \quad (44)$$

At the device B, $t_{b1}$ and $(t_{a1}+t_{a2}+t_{b2})$ can be estimated from Expression (41), Expression (43), and Expression (44). Expression (39) can be rewritten to obtain Expression (45).

$$t_x=(t_{x1}+t_{x2})/2=\{2T_S-(t_{a1}+t_{b1}+t_{a2}+t_{b2})\}/4 \quad (45)$$

Thus, the flight distance can be estimated by using Expression (45) with addition of $t_{b1}$ and $(t_{a1}+t_{a2}+t_{b2})$ estimated at the device B.

Note that although not illustrated, it is clear that the method of performing phase detection K times for each m samples and averaging elapsed times obtained from detected phases in the second embodiment is also applicable to the present embodiment.

According to the fifth embodiment, 1.5 round trip distance measurement in the third embodiment and phase loop-back distance measurement in the fourth embodiment can be combined to estimate $t_{a1}+t_{b1}+t_{a2}+t_{b2}$ at one of the device A and the device B (in the above description, the device B). Accordingly, the data communication time can be further reduced, and the distance measurement time period can be further reduced.

Sixth Embodiment

In a sixth embodiment, any part same as a part in the first to fifth embodiments is denoted by the same reference sign, description of the part is omitted, and difference will be mainly described.

The elapsed times $t_{a1}$, $t_{a2}$, $t_{b1}$, and $t_{b2}$ until sampling since crossing of the offset phase $\theta_{OFF}$ are calculated by using, for example, Expressions (2) and (3) based on phases $\theta_{GMSK,ai}$ and $\theta_{GMSK,bi}$ (i=1, 2) sampled first after the offset phase $\theta_{OFF}$.

Assume that the device A has an accurate clock and the device B has frequency error as defined in Expressions (7) and (8). Expression (7) is given as Expression (46) by using the reference clock frequency $f_A$ of the device A and the reference clock frequency $f_B$ of the device B.

$$f_A/f_B=1-r_{err} \quad (46)$$

The frequency of the RF signal (distance measurement signal) generated at each of the device A and the device B is a frequency obtained by multiplying the reference clock frequency by a predetermined integer multiple, and thus error occurs to the frequency of the RF signal at a ratio same as a ratio for the reference clock frequency. Specifically, when an RF frequency of the device A is represented by $f_{RFA}$ and an RF frequency of the device B is represented by $f_{RFB}$, Expression (47) is obtained.

$$f_{RFA}/f_{RFB}=1-r_{err} \quad (47)$$

Thus, the RF frequency $f_{RFB}$ of the device B is higher than the RF frequency $f_{RFA}$ of the device A by $r_{err}f_{RFB}$. Thus, when the RF frequencies of the device A and the device B are set to be equal, the RF signal of the device B is received by the device A not as a direct current (DC) signal but as a signal of the frequency $r_{err}f_{RFB}$.

When a frequency corresponding to this difference is represented by $f_\Delta = r_{err}f_{RFB}$ and a difference between initial phases of the device B and the device A is represented by $\Delta\theta_{BA}$, the phase of the distance measurement signal received by the device A is given by Expression (48).

$$\theta_{GMSK,a} \approx A_{01}\sin(2\pi f_{01}t) + 2\pi f_\Delta t + \theta_{OFF} + \Delta\theta_{BA} \quad (48)$$

A time needed to be calculated is a time of crossing the offset phase $\theta_{OFF}$ with no frequency offset between the device A and the device B. Phase change is maximum at the time of crossing the offset phase $\theta_{OFF}$. The maximum phase change at the time of crossing the offset phase $\theta_{OFF}$ occurs irrespective of the frequency offset $f_\Delta$ and the initial phase difference $\Delta\theta_{BA}$. Thus, a time at which a value obtained by differentiating Expression (48) with respect to time is maximum is a time at which the distance measurement signal arrives at the device A. The time differential of Expression (48) is given by Expression (49).

$$d\theta_{GMSK,a}/dt \approx 2\pi f_{01}A_{01}\cos(2\pi f_{01}t) + 2\pi f_\Delta \quad (49)$$

Expression (49) has a maximum value of $2\pi f_{01}A_{01} + 2\pi f_\Delta$ at $t=0$ [s].

When there is no frequency offset because the reference clocks of the device A and the device B are completely identical to each other and when initial phases are identical to each other, the distance measurement signal of Expression (1) is received by the device A. A time differential of Expression (1) has a maximum value of $2\pi f_{01}A_{01}$ at a time of $t=0$ [s]. Although the maximum value has a difference due to a frequency difference, a time $t_{arvA}$ of arrival at the device A can be detected by detecting a time at which a time differential of the phase has a maximum value.

However, since the sampling period cannot be infinitesimally small but is finite, the time at which the differential of the phase has a maximum value needs to be estimated from phases acquired at sample points. When, for example, phases at three points are sampled per quadrant to increase accuracy of the estimation, the sampling frequency is $12f_{01}$. The following describes processing of estimating the arrival time $t_{arvA}$ from sampled phases.

The estimation of the arrival time $t_{arvA}$ is performed through a difference operation replacing a differential operation based on Expression (48). The offset phase $\theta_{OFF} + \Delta\theta_{BA}$ in the phase signal of Expression (48) is replaced with $\theta_{FFA} = \theta_{OFF} - \Delta\theta_{BA}$ for simplification.

First, the device A observes the phase $\theta_{GMSK,a}$ of a received phase signal for a duration equal to or longer than the modulation period $T_{01} = 1/f_{01}$. The modulation period is known through beforehand communication between the device A and the device B, and thus the number of samples is determined accordingly. In the present assumption, a maximum value of a phase change amount can be detected through phase observation at 12 samples or more in the sampling period $T_S$. The 12 samples are represented by $t_i$ ($i=0$ to 11). Sampling is performed a larger number of times in reality, in which phase observation is performed at 12 samples or more, but for description, the arrival time $t_{arvA}$ estimated by the device A based on particular 12 samples is calculated.

The maximum value of the change amount of the received phase $\theta_{GMSK,a}$ can be calculated by calculating a value of Expression (50) for $i=0$ to 10 and determining a maximum value among the values.

$$\Delta\theta_{GMSK,a}(t_i) = \theta_{GMSK,a}(t_{i+1}) - \theta_{GMSK,a}(t_i) \text{ for } i=0 \text{ to } 10 \quad (50)$$

Three samples are extracted based on the sample time $t_i$ that provides the maximum value of the phase change amount. Note that estimation accuracy of the arrival time $t_{arvA}$ can be further increased with samples in the number of three or larger, but the present description is made on a process of estimating the arrival time $t_{sumA}$ with three samples.

Figure 16:
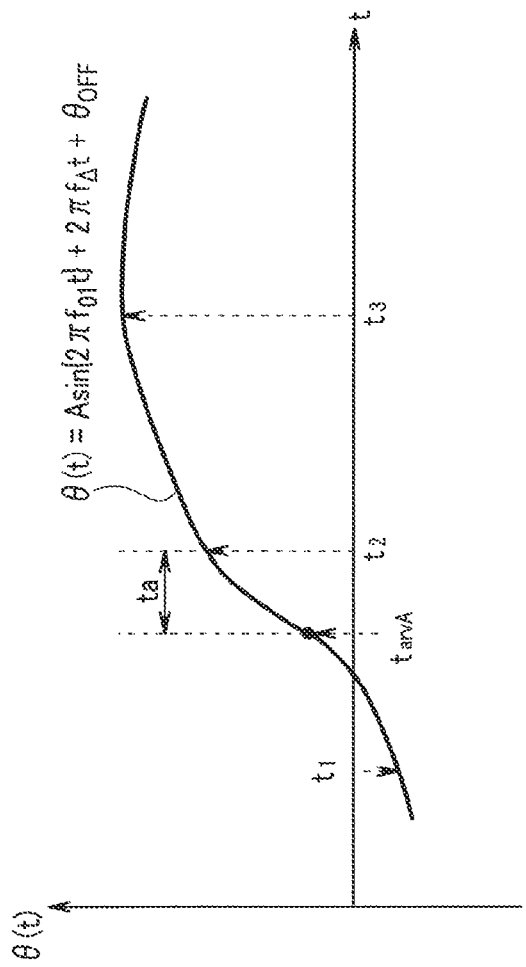
FIG. 16 is a time chart illustrating an example in which an arrival time $t_{arvA}$ of the distance measurement signal is between a sample time $t_1$ and a sample time $t_2$ in a sixth embodiment.

FIG. 16 illustrates a relation between $\theta_{GMSK,a}(t_i)$ and the sample point $t_i$ when the maximum value of $\Delta\theta_{GMSK,a}(t_i)$ is provided at $i=1$, in other words, when the arrival time $t_{arvA}$ of the distance measurement signal from the device B, which is to be calculated, is between the sample time $t_1$ and the sample time $t_2$. FIG. 16 is a time chart illustrating an example in which the arrival time $t_{arvA}$ of the distance measurement signal is between the sample time $t_1$ and the sample time $t_2$ in the present embodiment.

In this case, three sample points used to estimate the arrival time $t_{arvA}$ are $t_1$, $t_2$, and $t_3$. Note that the same result can be obtained when the sample points are $t_0$, $t_1$, and $t_2$, but description of such a case is omitted.

Formulae that associate the detection phase $\theta_{GMSK,a}(t_i)$ with the sample points of times $t_1$, $t_2$, and $t_3$ are Expressions (51) to (53) below.

$$\theta_{GMSK,a}(t_1) \approx A_{01}\sin(2\pi f_{01}t_1) + 2\pi f_\Delta t_1 + \theta_{OFFA} \quad (51)$$

$$\theta_{GMSK,a}(t_2) \approx A_{01}\sin(2\pi f_{01}t_2) + 2\pi f_\Delta t_2 + \theta_{OFFA} \quad (52)$$

$$\theta_{GMSK,a}(t_3) \approx A_{01}\sin(2\pi f_{01}t_3) + 2\pi f_\Delta t_3 + \theta_{OFFA} \quad (53)$$

Since $T_S = t_2 - t_1 = t_3 - t_2$ holds, Expression (54) is obtained by subtracting, from a result obtained by subtracting Expression (52) from Expression (53), a result subtracting Expression (51) from Expression (52).

$$\theta_{GMSK,a}(t_3) - 2\theta_{GMSK,a}(t_2) + \theta_{GMSK,a}(t_1) = A_{01}\{\sin(2\pi f_{01}t_3) - 2\sin(2\pi f_{01}t_2) + \sin(2\pi f_{01}t_1)\} \quad (54)$$

Expression (57) is obtained when the sample times $t_1$ and $t_3$ in Expression (54) are expressed as Expressions (55) and (56), respectively, by using $t_2$ and substituted into Expression (54).

$$t_1 = -T_S + t_2 \quad (55)$$

$$t_3 = T_S + t_2 \quad (56)$$

$$\theta_{GMSK,a}(t_3) - 2\theta_{GMSK,a}(t_2) + \theta_{GMSK,a}(t_1) = 2A_{01}\sin(2\pi f_{01}t_2)\{\cos(2\pi f_{01}T_S) - 1\} \quad (57)$$

Since an elapsed time from the arrival time $t_{arvA}$ between the sample time $t_1$ and the sample time $t_2$ to the sample time $t_2$ is $t_a$, $t_2$ is expressed by Expression (58).

$$t_2 = t_{arvA} + t_a \quad (58)$$

Since the arrival time $t_{arvA}$ is a time at which the phase of the sinusoidal signal as the distance measurement signal becomes the offset phase $\theta_{OFF}$, Expression (59) is obtained.

$$\sin(2\pi f_{01}t_{arvA}) = 0 \quad (59)$$

When $\sin(2\pi f_{01}t_2)$ in Expression (57) is rewritten by using Expression (58), Expression (60) is obtained.

$$\sin(2\pi f_{01}t_2) = \sin\{2\pi f_{01}(t_{arvA} + t_a)\} = \sin(2\pi f_{01}t_a) \quad (60)$$

Expression (61) is obtained from Expressions (57) and (60).

$$\sin(2\pi f_{01}t_a) = [\theta_{GMSK,a}(t_3) - 2\theta_{GMSK,a}(t_2) + \theta_{GMSK,a}(t_1)]/[2A_{01}\{\cos(2\pi f_{01}T_S) - 1\}] \quad (61)$$

Expression (61) can be rewritten as Expression (62), which is an expression that calculates $t_a$.

$$t_a=\{1/(2\pi f_{01})\}\sin^{-1}[\{\theta_{GMSK,a}(t_3)-2\theta_{GMSK,a}(t_2)+\theta_{GMSK,a}(t_1)\}/(2A_{01}\{\cos(2\pi f_{01}T_S)-1\})] \quad (62)$$

Expression (62) indicates that $t_a$ can be calculated from a result of the phase detection at three points, the sampling period $T_S$, the frequency $f_{01}$ of the GMSK signal of 0 and 1, and the amplitude $A_{01}$. From Expression (58), the arrival time $t_{arvA}$ of the distance measurement signal is earlier than the sample time $t_2$ by the elapsed time $t_a$. Note that, as described up to the fifth embodiment, $t_a$ calculated by Expression (62) is needed to calculate the flight time $t_x$.

It is trivial that the same processing can be performed to calculate the elapsed time $t_b$ from an arrival time point of the distance measurement signal detected by the device B to the sample point, and $t_{a1}$, $t_{b1}$, $t_{a2}$, and $t_{b2}$ detected in an alternation sequence.

According to the sixth embodiment, the times $t_{arvA}$ and $t_{arvB}$ at which the distance measurement signal arrives can be accurately calculated at Devices A and B described in the first to fifth embodiments.

Seventh Embodiment

In the seventh embodiment, any part same as a part in the first to sixth embodiments is denoted by the same reference sign, description of the part is omitted, and difference will be mainly described.

In the sixth embodiment, the elapsed time $t_a$ from the arrival time point of the distance measurement signal to the sample point is calculated by extracting only three points from among 12 sample points. The present embodiment describes a method to which the method of the sixth embodiment is extended and that calculates $t_a$ by using four or more sample points. Note that the description assumes that conditions on the sample points are identical to conditions in the sixth embodiment.

Figure 17:
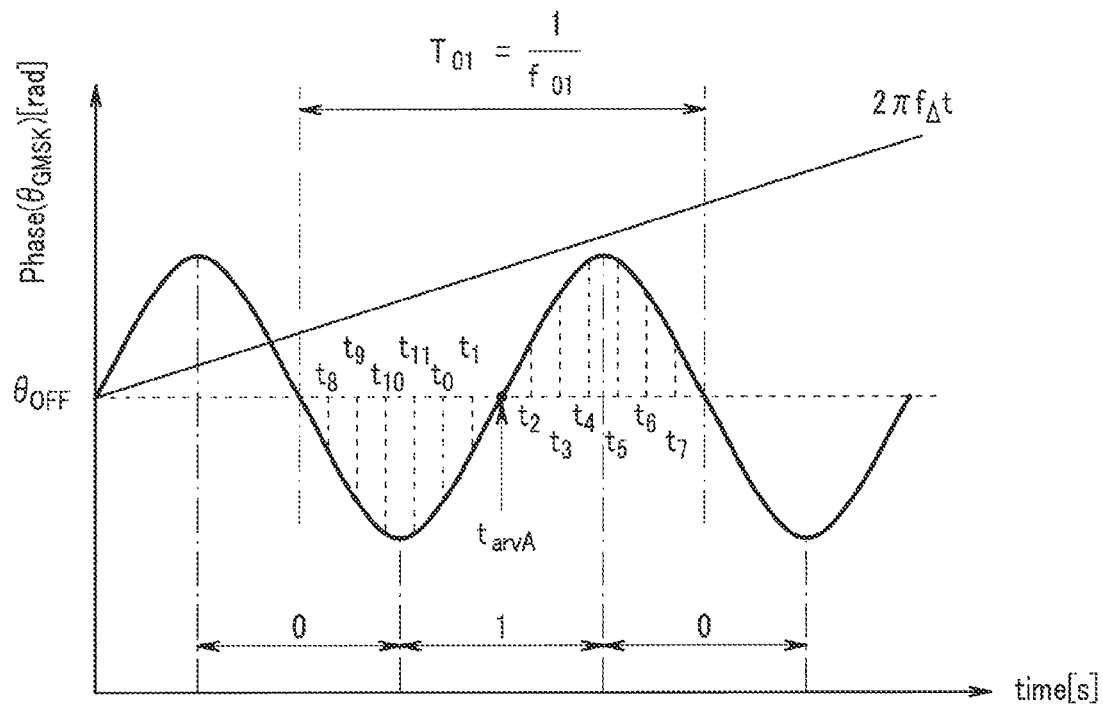
FIG. 17 is a time chart for description of a method of calculating $t_a$ by using four or more sample points in a seventh embodiment.

FIG. 17 is a time chart for description of a method of calculating $t_a$ by using four or more sample points in the present embodiment.

As illustrated in FIG. 17, times of 12 samples in total, six samples before and six samples after the arrival time $t_{arvA}$ of the distance measurement signal, are sequentially referred to as $t_8$, $t_9$, $t_{10}$, $t_{11}$, $t_0$, $t_1$, $t_2$, $t_3$, $t_4$, $t_5$, $t_6$, and $t_7$.

The sixth embodiment uses samples at $t_1$ and $t_3$, one sample time $T_S$ before and after the sample time $t_2$ when the elapsed time $t_a$ has elapsed since the arrival time $t_{arvA}$. In contrast, the present embodiment uses samples at $t_{mod(2-i)}$ and $t_{2+i}$, i sample times $iT_S$ before and after the sample time $t_2$, where mod represents a residue of 12, and for example, mod(−1)=11. Exemplary calculation in a case of i=2 will be described below.

In a case of i=2, sample times other than the sample time $t_2$ are $t_0$ and $t_4$, and phases are given by Expressions (63) and (64). Note that Expression (52) at the sample time $t_2$ is listed below again.

$$\theta_{GMSK,a}(t_0)\approx A_{01}\sin(2\pi f_{01}t_0)+2\pi f_\Delta t_0+\theta_{OFFA} \quad (63)$$

$$\theta_{GMSK,a}(t_2)\approx A_{01}\sin(2\pi f_{01}t_2)+2\pi f_\Delta t_2+\theta_{OFFA} \quad (52)$$

$$\theta_{GMSK,a}(t_4)\approx A_{01}\sin(2\pi f_{01}t_4)+2\pi f_\Delta t_4+\theta_{OFFA} \quad (64)$$

Similarly to derivation of Expression (54) by using Expressions (51) to (53), Expression (65) can be obtained by using Expressions (63), (52), and (64).

$$\theta_{GMSK,a}(t_4)-2\theta_{GMSK,a}(t_2)+\theta_{GMSK,a}(t_0)=A_{01}\{\sin(2\pi f_{01}t_4)-2\sin(2\pi f_{01}t_2)+\sin(2\pi f_{10}t_0)\} \quad (65)$$

In addition, Expressions (66) and (67) below hold.

$$t_0=-2T_S+t_2 \quad (66)$$

$$t_4=2T_S+t_2 \quad (67)$$

Expression (65) can be rewritten as Expression (68) by using Expressions (66) and (67).

$$\theta_{GMSK,a}(t_4)-2\theta_{GMSK,a}(t_2)+\theta_{GMSK,a}(t_0)=2A_{01}\sin(2\pi f_{01}t_2)\{\cos(2\pi f_{01}2T_S)-1\} \quad (68)$$

Processing same as processing for obtaining a result of Expression (62) is performed to obtain the elapsed time $t_a$ as in Expression (69).

$$t_a=\{1/(2\pi f_{01})\}\sin^{-1}[\{(\theta_{GMSK,a}(t_3)-2\theta_{GMSK,a}(t_2)+\theta_{GMSK,a}(t_1)\}/(2A_{01}\{\cos(2\pi f_{01}2T_S)-1\})] \quad (69)$$

When calculated through the same processing for i≤5 in the present assumption, the elapsed time $t_a$ is given by Expression (70).

$$t_a=\{1/(2\pi f_{01})\}\sin^{-1}[\{\theta_{GMSK,a}(t_{2+i})-2\theta_{GMSK,a}(t_2)+\theta_{GMSK,a}(t_{mod(2-i)})\}/(2A_{01}\{\cos(2\pi f_{01}iT_S)-1\})] \quad (70)$$

When the elapsed time $t_a$ calculated by Expression (70) for i=1, 2, 3, 4, and 5 is newly written an elapsed time $t_{a,i}$, the elapsed time $t_a$ can be calculated by Expression (71) as an average value over a large number of sample points.

$$t_a=(1/5)\times\Sigma_{i=1}^{5}t_{a,i} \quad (71)$$

However, when the number of phase sample points for the frequency $f_{01}$ of the GMSK signal of 0 and 1 is 12 as in the present assumption, a sample at $t_8$, which is shifted from the sample time $t_2$ by half the period, is not used in averaging. To avoid this, the number of sample points in one period needs to be an odd number.

Note that the averaging of the elapsed time $t_a$ may be performed by averaging the phase term of $\sin^{-1}$ in Expression (70) and then converting the average into time. In this case, Expression (72) is obtained.

$$t_a=\{1/(2\pi f_{01})\}\sin^{-1}[(1/5)\times\Sigma_{i=1}^{5}\{\theta_{GMSK,a}(t_{2+i})-2\theta_{GMSK,a}(t_2)+\theta_{GMSK,a}(t_{mod(2-i)})\}/(2A_{01}\{\cos(2\pi f_{01}iT_S)-1\})] \quad (72)$$

Thus, averaging over a large number of sample points is possible through phase averaging as well.

Note that it is trivial that the same processing can be performed to calculate the elapsed time $t_b$ from the arrival time point of the distance measurement signal detected by the device B to the sample point, and $t_{a1}$, $t_{b1}$, $t_{a2}$, and $t_{b2}$ detected through an alternation sequence.

According to the seventh embodiment, effects substantially same as effects of the first to sixth embodiments described above are achieved, and in addition, it is possible to easily obtain a time until sampling since the distance measurement signal arrives at each device, which is necessary for calculating the distance. The same result can be obtained through phase averaging in place of time averaging.

While certain embodiments have been described, these embodiments have been presented by way of example only, and are not intended to limit the scope of the inventions. Indeed, the novel devices described herein may be embodied in a variety of other forms; furthermore, various omissions, substitutions and changes in the form of the devices described herein may be made without departing from the spirit of the inventions. The accompanying claims and their equivalents are intended to cover such forms or modifications as would fall within the scope and spirit of the inventions.

What is claimed is:

1. A distance measurement device comprising:
a first device including
a first reference signal source configured to generate a first reference signal, and
a first transmitter-receiver configured to transmit a modulated first distance measurement signal, receive a modulated second distance measurement signal, obtain a second demodulated signal through demodulation, and acquire second phase information of the second demodulated signal in a first sampling period based on the first reference signal;
a second device including
a second reference signal source configured to operate independently from the first reference signal source and generate a second reference signal, and
a second transmitter-receiver configured to transmit the second distance measurement signal, receive the first distance measurement signal, obtain a first demodulated signal through demodulation, and acquire first phase information of the first demodulated signal in a second sampling period based on the second reference signal; and
a calculation unit configured to calculate a distance between the first device and the second device based on the first phase information and the second phase information, wherein
one of the first distance measurement signal and the second distance measurement signal is transmitted once or more, and another of the first distance measurement signal and the second distance measurement signal is transmitted twice or more, and
the calculation unit calculates the distance based on a total of three or more pieces of the first phase information and the second phase information acquired through transmission of the first distance measurement signal and the second distance measurement signal three times or more in total, the first sampling period, and the second sampling period.

2. The distance measurement device according to claim 1, wherein when calculating the distance, the calculation unit
corrects a time offset between the first sampling period and the second sampling period based on first phase information and second phase information obtained through loop-back transmission of the first distance measurement signal and the second distance measurement signal, and
corrects a frequency offset between the first sampling period and the second sampling period based on the first phase information and the second phase information obtained through the loop-back transmission and at least one of first phase information and second phase information obtained through transmission one or more times of at least one of the first distance measurement signal and the second distance measurement signal other than the loop-back transmission.

3. The distance measurement device according to claim 2, wherein the calculation unit calculates the distance based on two or more pieces of the first phase information and one or more pieces of the second phase information obtained through a distance measurement sequence in which
the first transmitter-receiver transmits the first distance measurement signal, and the second transmitter-receiver receives the first distance measurement signal,
the second transmitter-receiver transmits the second distance measurement signal, and the first transmitter-receiver receives the second distance measurement signal, and
the first transmitter-receiver transmits the first distance measurement signal, and the second transmitter-receiver receives the first distance measurement signal.

4. The distance measurement device according to claim 2, wherein the calculation unit calculates the distance based on two or more pieces of the first phase information and two or more pieces of the second phase information obtained through a distance measurement sequence in which
the first transmitter-receiver transmits the first distance measurement signal, and the second transmitter-receiver receives the first distance measurement signal,
the second transmitter-receiver transmits the second distance measurement signal, and the first transmitter-receiver receives the second distance measurement signal,
the second transmitter-receiver transmits the second distance measurement signal, and the first transmitter-receiver receives the second distance measurement signal, and
the first transmitter-receiver transmits the first distance measurement signal, and the second transmitter-receiver receives the first distance measurement signal.

5. The distance measurement device according to claim 2, wherein the calculation unit calculates the distance based on two or more pieces of the first phase information and one or more pieces of the second phase information obtained through a distance measurement sequence in which
the first transmitter-receiver transmits the first distance measurement signal, and the second transmitter-receiver receives the first distance measurement signal,
the second transmitter-receiver transmits the second distance measurement signal, and the first transmitter-receiver receives the second distance measurement signal, and
the first transmitter-receiver sets a phase of the received second distance measurement signal as a phase at transmission start and transmits the first distance measurement signal, and the second transmitter-receiver receives the first distance measurement signal.

6. The distance measurement device according to claim 1, wherein
the first transmitter-receiver samples the second phase information for one period of the second demodulated signal or longer,
the second transmitter-receiver performs, twice or more, sampling of the first phase information for one period of the first demodulated signal or longer, and
the calculation unit
obtains, for each of the second demodulated signal and the first demodulated signal, two samples, phase change of which is maximized through subtraction of a temporally previous sample of a sample,
calculates, by using three continuous samples including the two samples of the first demodulated signal for a first time, an elapsed time $t_{b1}$ of the second device from a time point at which the reception of the first demodulated signal is started, to a time point at which the first demodulated signal is sampled is obtained,
calculates, by using three continuous samples including the two samples of the second demodulated signal, an elapsed time $t_{a1}$ of the first device from a time point at which the reception of the second demodulated signal is started, to a time point at which the second demodulated signal is sampled is obtained, calculates, by using three continuous samples including the two samples of the first demodulated signal for a second time, an elapsed time $t_{b2}$ of the second device from a time point at which the reception of the first demodulated signal is started, to a time point at which the first demodulated signal is sampled is obtained, calculates a first flight time $t_{x,err1}$ including error by $$t_{x,err1}=(T_S-t_{a1}-t_{b1})/2$$

where $T_S$ represents the first or second sampling period, calculates a second flight time $t_{x,err2}$ including error by $$t_{x,err2}=(T_S-t_{a1}-t_{b2})/2$$

calculates an average flight time by averaging the first flight time $t_{x,err1}$ and the second flight time $t_{x,err2}$ and calculates the distance based on the average flight time.

7. The distance measurement device according to claim 6, wherein the first transmitter-receiver performs, twice or more, sampling of the second phase information for one period of the second demodulated signal or longer, and the calculation unit calculates, by using three continuous samples including the two samples of the second demodulated signal for a second time, an elapsed time $t_{a2}$ of the first device from a time point at which the reception of the second demodulated signal is started, to a time point at which the second demodulated signal is sampled is obtained, calculates the second flight time $t_{x,err2}$ by $$t_{x,err2}=(T_S-t_{a2}-t_{b2})/2$$

in place of the calculation expression, calculates an average flight time by averaging the first flight time $t_{x,err1}$ and the second flight time $t_{x,err2}$, and calculates the distance based on the average flight time.

8. The distance measurement device according to claim 6, wherein the calculation unit uses, as the elapsed time $t_{a1}$, an average elapsed time obtained by averaging a plurality of elapsed times of the first device obtained based on the second distance measurement signal for two periods or longer, and uses, as the elapsed time $t_{b1}$ and the elapsed time $t_{b2}$, an average elapsed time obtained by averaging a plurality of elapsed times of the second device obtained based on the first distance measurement signal for two periods or longer.

9. The distance measurement device according to claim 1, wherein the first transmitter-receiver samples the second phase information for one period of the second demodulated signal or longer, the second transmitter-receiver performs, twice or more, sampling of the first phase information for one period of the first demodulated signal or longer, when k is a natural number, the calculation unit obtains, for each of the second demodulated signal and the first demodulated signal, two samples, phase change of which is maximized through subtraction of a temporally previous sample of a sample, and sets a reference sample to be a temporally later sample among the two samples, phase change of which is maximized, and for three samples of the reference sample and two samples temporally k samples before and k samples after the reference sample, the calculation unit calculates, by using the three samples of the first demodulated signal for a first time, an elapsed time $t_{b1}$ of the second device from a time point at which the reception of the first demodulated signal is started, to a time point at which the first demodulated signal is sampled is obtained, calculates, by using the three samples of the second demodulated signal, an elapsed time $t_{a1}$ of the first device from a time point at which the reception of the second demodulated signal is started, to a time point at which the second demodulated signal is sampled is obtained, calculates, by using the three samples of the first demodulated signal for a second time, an elapsed time $t_{b2}$ of the second device from a time point at which the reception of the first demodulated signal is started, to a time point at which the first demodulated signal is sampled is obtained, calculates a first flight time $t_{x,err1}$ including error by $$t_{x,err1}=(T_S-t_{a1}-t_{b1})/2$$

where $T_S$ represents the first or second sampling period, calculates a second flight time $t_{x,err2}$ including error by $$t_{x,err2}=(T_S-t_{a1}-t_{b2})/2$$

calculates an average flight time by averaging the first flight time $t_{x,err1}$ and the second flight time $t_{x,err2}$, and calculates the distance based on the average flight time.

10. The distance measurement device according to claim 9, wherein when kmax is a maximum value of the k, the calculation unit uses, as the elapsed time $t_{a1}$, an average elapsed time obtained by averaging kmax or less elapsed times of the first device obtained based on the second distance measurement signal for two periods or longer, and uses, as the elapsed time $t_{b1}$ and the elapsed time $t_{b2}$, an average elapsed time obtained by averaging kmax or less elapsed times of the second device obtained based on the first distance measurement signal for two periods or longer.

11. A distance measurement method of calculating a distance between a first device and a second device, wherein the first device generates a first reference signal, the first device transmits a modulated first distance measurement signal, receives a modulated second distance measurement signal, obtains a second demodulated signal through demodulation, and acquires second phase information of the second demodulated signal in a first sampling period based on the first reference signal, the second device generates a second reference signal independent from the first reference signal, the second device transmits the second distance measurement signal, receives the first distance measurement signal, obtains a first demodulated signal through demodulation, and acquires first phase information of the first demodulated signal in a second sampling period based on the second reference signal, a distance between the first device and the second device is calculated based on the first phase information and the second phase information, one of the first distance measurement signal and the second distance measurement signal is transmitted once or more, and another of the first distance measurement signal and the second distance measurement signal is transmitted twice or more, and the distance is calculated based on a total of three or more pieces of the first phase information and the second phase information acquired through transmission of the first distance measurement signal and the second distance measurement signal three times or more in total, the first sampling period, and the second sampling period.

12. The distance measurement method according to claim 11, wherein when the distance is calculated,
a time offset between the first sampling period and the second sampling period is corrected based on first phase information and second phase information obtained through loop-back transmission of the first distance measurement signal and the second distance measurement signal, and
a frequency offset between the first sampling period and the second sampling period is corrected based on the first phase information and the second phase information obtained through the loop-back transmission and at least one of first phase information and second phase information obtained through transmission one or more times of at least one of the first distance measurement signal and the second distance measurement signal other than the loop-back transmission.

13. The distance measurement method according to claim 12, wherein the distance is calculated based on two or more pieces of the first phase information and one or more pieces of the second phase information obtained through a distance measurement sequence in which
the first device transmits the first distance measurement signal, and the second device receives the first distance measurement signal,
the second device transmits the second distance measurement signal, and the first device receives the second distance measurement signal, and
the first device transmits the first distance measurement signal, and the second device receives the first distance measurement signal.

14. The distance measurement method according to claim 12, wherein the distance is calculated based on two or more pieces of the first phase information and two or more pieces of the second phase information obtained through a distance measurement sequence in which
the first device transmits the first distance measurement signal, and the second device receives the first distance measurement signal,
the second device transmits the second distance measurement signal, and the first device receives the second distance measurement signal,
the second device transmits the second distance measurement signal, and the first device receives the second distance measurement signal, and
the first device transmits the first distance measurement signal, and the second device receives the first distance measurement signal.

15. The distance measurement method according to claim 12, wherein the distance is calculated based on two or more pieces of the first phase information and one or more pieces of the second phase information obtained through a distance measurement sequence in which
the first device transmits the first distance measurement signal, and the second device receives the first distance measurement signal,
the second device transmits the second distance measurement signal, and the first device receives the second distance measurement signal, and the first device sets a phase of the received second distance measurement signal as a phase at transmission start and transmits the first distance measurement signal, and the second device receives the first distance measurement signal.

16. The distance measurement method according to claim 11, wherein
the first device samples the second phase information for one period of the second demodulated signal or longer,
the second device performs, twice or more, sampling of the first phase information for one period of the first demodulated signal or longer,
two samples, phase change of which is maximized through subtraction of a temporally previous sample of a sample are obtained for each of the second demodulated signal and the first demodulated signal,
an elapsed time $t_{b1}$ of the second device from a time point at which the reception of the first demodulated signal is started, to a time point at which the reception of the first demodulated signal is sampled is calculated by using three continuous samples including the two samples of the first demodulated signal for a first time,
an elapsed time $t_{a1}$ of the first device from a time point at which the reception of the second demodulated signal is started, to a time point at which the second demodulated signal is sampled is calculated by using three continuous samples including the two samples of the second demodulated signal,
an elapsed time $t_{b2}$ of the second device from a time point at which the reception of the first demodulated signal is started, to a time point at which the first demodulated signal is sampled is calculated by using three continuous samples including the two samples of the first demodulated signal for a second time,
a first flight time $t_{x,err1}$ including error is calculated by $$t_{x,err1}=(T_S-t_{a1}-t_{b1})/2$$

where $T_S$ represents the first or second sampling period,
a second flight time $t_{x,err2}$ including error is calculated by $$t_{x,err2}=(T_S-t_{a1}-t_{b2})/2$$

an average flight time is calculated by averaging the first flight time $t_{x,err1}$ and the second flight time $t_{x,err2}$, and
the distance is calculated based on the average flight time.

17. The distance measurement method according to claim 16, wherein
the first device performs, twice or more, sampling of the second phase information for one period of the second demodulated signal or longer,
an elapsed time $t_{a2}$ of the first device from a time point at which the reception of the second demodulated signal is started, to a time point at which the second demodulated signal is sampled is calculated by using three continuous samples including the two samples of the second demodulated signal for a second time,
the second flight time $t_{x,err2}$ is calculated by $$t_{x,err2}=(T_S-t_{a2}-t_{b2})/2$$

in place of the calculation expression,
an average flight time is calculated by averaging the first flight time $t_{x,err1}$ and the second flight time $t_{x,err2}$, and
the distance is calculated based on the average flight time.

18. The distance measurement method according to claim 16, wherein
an average elapsed time obtained by averaging a plurality of elapsed times of the first device obtained based on the second distance measurement signal for two periods or longer is used as the elapsed time $t_{a1}$, and an average elapsed time obtained by averaging a plurality of elapsed times of the second device obtained based on the first distance measurement signal for two periods or longer is used as the elapsed time $t_{b1}$ and the elapsed time $t_{b2}$.

19. The distance measurement method according to claim 11, wherein the first device samples the second phase information for one period of the second demodulated signal or longer, the second device performs, twice or more, sampling of the first phase information for one period of the first demodulated signal or longer, when k is a natural number, two samples, phase change of which is maximized through subtraction of a temporally previous sample of a sample are obtained for each of the second demodulated signal and the first demodulated signal, a reference sample is set to be a temporally later sample among the two samples, phase change of which is maximized, for three samples of the reference sample and two samples temporally k samples before and k samples after the reference sample, an elapsed time $t_{b1}$ of the second device from a time point at which the reception of the first demodulated signal is started, to a time point at which the first demodulated signal is sampled is calculated by using the three samples of the first demodulated signal for a first time, an elapsed time $t_{a1}$ of the first device from a time point at which the reception of the second demodulated signal started, to a time point at which the second demodulated signal is sampled is calculated by using the three samples of the second demodulated signal, an elapsed time $t_{b2}$ of the second device from a time point at which the reception of the first demodulated signal is started, to a time point at which the first demodulated signal is sampled is calculated by using the three samples of the first demodulated signal for a second time, a first flight time $t_{x,err1}$ including error is calculated by $$t_{x,err1}=(T_S-t_{a1}-t_{b1})/2$$

where $T_S$ represents the first or second sampling period, a second flight time $t_{x,err2}$ including error is calculated by $$t_{x,err2}=(T_S-t_{a1}-t_{b2})/2$$

an average flight time is calculated by averaging the first flight time $t_{x,err1}$ and the second flight time $t_{x,err2}$, and the distance is calculated based on the average flight time.

20. The distance measurement method according to claim 19, wherein when kmax is a maximum value of the k, an average elapsed time obtained by averaging kmax or less elapsed times of the first device obtained based on the second distance measurement signal for two periods or longer is used as the elapsed time $t_{a1}$, and an average elapsed time obtained by averaging kmax or less elapsed times of the second device obtained based on the first distance measurement signal for two periods or longer is used as the elapsed time $t_{b1}$ and the elapsed time $t_{b2}$.

* * * * *